US011248971B2

(12) United States Patent
Nicholl et al.

(10) Patent No.: US 11,248,971 B2
(45) Date of Patent: Feb. 15, 2022

(54) MAGNETIC FIELD TORQUE AND/OR ANGLE SENSOR

(71) Applicant: Analog Devices International Unlimited Company, Limerick (IE)

(72) Inventors: Enda Joseph Nicholl, Grange (IE); Jochen Schmitt, Biedenkopf (DE)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 234 days.

(21) Appl. No.: 16/243,939

(22) Filed: Jan. 9, 2019

(65) Prior Publication Data

US 2019/0242764 A1 Aug. 8, 2019

Related U.S. Application Data

(60) Provisional application No. 62/625,912, filed on Feb. 2, 2018.

(51) Int. Cl.
*G01L 3/10* (2006.01)
*G01D 5/245* (2006.01)

(52) U.S. Cl.
CPC ............. *G01L 3/105* (2013.01); *G01D 5/245* (2013.01); *G01D 5/2452* (2013.01)

(58) Field of Classification Search
CPC ......... G01L 3/105; G01L 3/104; G01L 5/221; G01D 5/2452; G01D 5/245
See application file for complete search history.

(56) References Cited

U.S. PATENT DOCUMENTS

| 3,538,762 A | 11/1970 | Parkinson et al. |
| 4,506,217 A | 3/1985 | Rothley et al. |
| 4,724,710 A | 2/1988 | Murty |
| 5,200,747 A | 4/1993 | Betz et al. |

(Continued)

FOREIGN PATENT DOCUMENTS

| CN | 108844557 A | 11/2018 |
| DE | 197 22 834 | 12/1998 |

(Continued)

OTHER PUBLICATIONS

Decision of Rejection for Japanese Patent Application No. 2019-17000 dated Jun. 29, 2020.

(Continued)

*Primary Examiner* — Freddie Kirkland, III
(74) *Attorney, Agent, or Firm* — Knobbe, Martens, Olson & Bear LLP

(57) ABSTRACT

Aspects of this disclosure relate to a magnetic sensor system for measuring any desired combination of measuring torque, rotation angle, and turn count of a shaft. The shaft may include two portions connected by a torsion element. The system can measure rotation angle using a magnetic target coupled to the shaft that produces a magnetic field that varies as a function of rotation angle. The system can measure torque applied to the shaft by measuring the difference in rotation angles between the two portions of the shaft and factoring in a torsion coefficient. The system can track a turn count of the shaft using a multi-turn sensor. The magnetic sensor system may be part of an electric power assisted steering (EPAS) system.

20 Claims, 16 Drawing Sheets

(56) References Cited

U.S. PATENT DOCUMENTS

| | | | |
|---|---|---|---|
| 5,359,287 A | 10/1994 | Watanabe et al. | |
| 5,930,905 A | 8/1999 | Zabler et al. | |
| 6,047,605 A | 4/2000 | Garshelis | |
| 6,291,989 B1 | 9/2001 | Schroeder | |
| 6,363,797 B1* | 4/2002 | Tokumoto | G01L 5/221 |
| | | | 73/862.328 |
| 6,366,079 B1 | 4/2002 | Uenoyama | |
| 6,439,067 B1 | 8/2002 | Goldman et al. | |
| 6,466,889 B1 | 10/2002 | Schödlbauer | |
| 6,498,482 B2 | 12/2002 | Schroeder | |
| 6,515,571 B2 | 2/2003 | Takeda | |
| 6,543,571 B2* | 4/2003 | Tokumoto | G01L 3/101 |
| | | | 180/446 |
| 6,871,555 B2* | 3/2005 | May | G01L 3/102 |
| | | | 73/862.333 |
| 6,924,639 B2* | 8/2005 | Uenoyama | G01D 5/142 |
| | | | 324/207.21 |
| 6,941,241 B2 | 9/2005 | Lee et al. | |
| 6,973,991 B2* | 12/2005 | Tokumoto | B62D 5/0472 |
| | | | 180/443 |
| 6,978,685 B2* | 12/2005 | Shiba | B62D 6/10 |
| | | | 73/862.334 |
| 6,981,423 B1 | 1/2006 | Discenzo | |
| 6,988,421 B2* | 1/2006 | Tokumoto | B62D 6/10 |
| | | | 73/862.333 |
| 7,028,545 B2 | 4/2006 | Gandel et al. | |
| 7,089,809 B2 | 8/2006 | Nakane et al. | |
| 7,174,795 B2* | 2/2007 | Feng | G01D 5/145 |
| | | | 73/862.331 |
| 7,215,112 B1 | 5/2007 | Recio et al. | |
| 7,635,974 B2 | 12/2009 | Guo et al. | |
| 7,856,338 B2 | 12/2010 | Maone et al. | |
| 8,024,956 B2* | 9/2011 | Hammerschmidt | G01P 3/488 |
| | | | 73/1.11 |
| 8,289,019 B2 | 10/2012 | Koller et al. | |
| 8,575,920 B2 | 11/2013 | Ausserlechner | |
| 8,766,623 B2 | 7/2014 | Ausserlechner et al. | |
| 8,890,514 B2 | 11/2014 | Masson et al. | |
| 9,322,887 B1 | 4/2016 | Eagen et al. | |
| 9,347,799 B2* | 5/2016 | Nazarian | G01D 5/145 |
| 9,429,632 B2 | 8/2016 | Kawano et al. | |
| 9,470,506 B2 | 10/2016 | Schaffer | |
| 9,475,520 B2 | 10/2016 | Yanai et al. | |
| 9,719,806 B2 | 8/2017 | Foletto et al. | |
| 9,857,438 B2 | 1/2018 | Werth | |
| 9,933,323 B2* | 4/2018 | Schweizer | G01L 3/109 |
| 10,126,147 B2* | 11/2018 | Fujita | H02P 6/16 |
| 10,155,532 B2* | 12/2018 | Farrelly | G01L 5/22 |
| 10,254,303 B2 | 4/2019 | Grambichler et al. | |
| 10,274,507 B2 | 4/2019 | Binder | |
| 10,338,158 B2 | 7/2019 | Werth et al. | |
| 10,473,679 B2 | 11/2019 | Fontanes et al. | |
| 10,495,485 B2 | 12/2019 | Burdette et al. | |
| 10,605,874 B2 | 3/2020 | Lassalle-Baller et al. | |
| 10,613,113 B2* | 4/2020 | Hashimoto | G01P 3/4802 |
| 10,627,261 B2 | 4/2020 | Imai | |
| 10,656,170 B2 | 5/2020 | Lim et al. | |
| 10,732,194 B2 | 8/2020 | Hainz et al. | |
| 10,830,613 B2* | 11/2020 | Tonge | G01D 5/145 |
| 10,837,848 B2* | 11/2020 | Janisch | B62D 1/046 |
| 10,859,404 B2* | 12/2020 | Diegel | G01D 3/022 |
| 10,859,406 B2 | 12/2020 | Richard et al. | |
| 10,962,386 B2* | 3/2021 | Mattheis | G01P 3/487 |
| 2002/0035877 A1* | 3/2002 | Tokumoto | G01L 3/104 |
| | | | 73/862.333 |
| 2003/0145663 A1 | 8/2003 | Heisenberg et al. | |
| 2003/0173955 A1* | 9/2003 | Uenoyama | G01D 5/24476 |
| | | | 324/207.21 |
| 2004/0083823 A1* | 5/2004 | Tokumoto | G01L 5/221 |
| | | | 73/862.333 |
| 2007/0200564 A1 | 8/2007 | Motz et al. | |
| 2008/0250873 A1 | 10/2008 | Prudham et al. | |
| 2012/0260746 A1 | 10/2012 | Lee | |
| 2013/0169270 A1 | 7/2013 | Delbaere et al. | |
| 2013/0305843 A1 | 11/2013 | Lee et al. | |
| 2015/0022192 A1 | 1/2015 | Ausserlechner | |
| 2015/0331069 A1 | 11/2015 | Ausserlechner | |
| 2017/0137054 A1* | 5/2017 | Farrelly | B62D 6/10 |
| 2017/0167897 A1 | 6/2017 | Lackermaier et al. | |
| 2017/0219383 A1 | 8/2017 | Umehara et al. | |
| 2017/0276740 A1 | 9/2017 | Schmitt et al. | |
| 2018/0313912 A1 | 11/2018 | David et al. | |
| 2019/0120914 A1 | 4/2019 | Hammerschmidt et al. | |
| 2019/0331541 A1* | 10/2019 | Janisch | G01D 5/2053 |
| 2020/0004131 A1 | 2/2020 | Lassalle-Baller et al. | |
| 2020/0232823 A1* | 7/2020 | Weiland | G01D 5/247 |

FOREIGN PATENT DOCUMENTS

| | | |
|---|---|---|
| DE | 102005009923 | 9/2006 |
| DE | 102005009923 A1 | 9/2006 |
| DE | 102005018286 | 10/2006 |
| DE | 102007029819 B4 | 2/2012 |
| DE | 102008039331 B4 | 1/2015 |
| DE | 102018214296 A1 | 2/2019 |
| DE | 102017124542 A1 | 4/2019 |
| DE | 102019104895 A1 | 9/2019 |
| EP | 1 353 151 | 10/2003 |
| EP | 1403173 | 12/2006 |
| JP | 61-247568 | 11/1986 |
| JP | 8-320327 | 12/1996 |
| JP | 2004-117114 | 4/2004 |
| JP | 2004-245642 | 9/2004 |
| JP | 2006/119082 | 5/2006 |
| JP | 2007-285741 | 11/2007 |
| JP | 4737372 | 7/2011 |
| WO | WO 2002/071019 | 9/2002 |
| WO | WO 2005/076860 | 8/2005 |
| WO | WO 2008/101702 | 8/2008 |
| WO | WO 2012/010507 A1 | 1/2012 |

OTHER PUBLICATIONS

TLE5x09A16 (D) Analog AMR/GMR Angle Sensors data sheet. (Dec. 2018).

Stritzke et al., "Highly flexible absolute integrated encoder system on GMR-basis", pp. 132-137 (2013).

Pre-Appeal Examination Report issued in Japanese patent application No. 2019-17000 dated Nov. 6, 2020.

Japanese Office Action dated Mar. 16, 2020, in Japanese Application No. 2019-17000.

Loreit et al., "Novel magnetoresistive length measuring elements and length measurement concept for nm resolutions," Magnetoresistive Sensoren II, 2nd Symposium on Magnetoresistive Sensors and Magnetic Systems, Wetzlar, Germany (Mar. 18, 1993), pp. 87-97.

* cited by examiner

MAGNETIC FIELD TORQUE AND/OR ANGLE SENSOR

CROSS-REFERENCE TO RELATED APPLICATION

This application claims the benefit of priority under 35 U.S.C. § 119(e) of U.S. Provisional Patent Application No. 62/625,912, filed Feb. 2, 2018, titled "MAGNETIC FIELD TORQUE SENSOR," the disclosure of which is hereby incorporated by reference in its entirety.

FIELD OF DISCLOSURE

The described technology relates to measuring torque using a magnetic sensor.

BACKGROUND

A method to measure torque in a drive shaft system can involve introducing a torsion bar, which is designed to twist within its elasticity limits when torque is applied. The relative angle of twist across the shaft can then be measured and from that the torque inferred. In addition to measuring torque, some drive systems also desire the shaft rotational angle and/or speed to be measured along with counting the number of shaft rotations.

It can be difficult to measure the shaft torque, angle and turn count when the shaft is rotating continuously and without making contact with the shaft. Some solutions involve either a direct electrical connection between an angle sensor positioned on the shaft via a slip ring or clock spring arrangement. Some other solutions have achieved limited accuracy, have been complex in nature, and/or consume a relatively large physical area.

SUMMARY OF THE DISCLOSURE

The innovations described in the claims each have several aspects, no single one of which is solely responsible for its desirable attributes. Without limiting the scope of the claims, some prominent features of this disclosure will now be briefly described.

One aspect of this disclosure is a magnetic torque sensor system that includes, at least one bias magnet configured to produce at least one magnetic field, magnetic sensors, and a processing circuit in communication with the magnetic sensors. The magnetic sensors include a first magnetic sensor sensitive to changes in the at least one magnetic field induced by a first magnetic target, and a second magnetic sensor sensitive to changes in the at least one magnetic field induced by a second magnetic target. The processing circuit is configured to measure a rotation of the first magnetic target relative to the second magnetic target based on an output from the first magnetic sensor and an output from the second magnetic sensor. The processing circuit is configured to generate torque information associated with an amount of torque applied to a shaft based on the measured rotation of the first magnetic target relative to the second magnetic target.

The magnetic torque sensor system can include the first magnetic target and the second magnetic target. The first magnetic target can include a first toothed gear, and the second magnetic target can a second toothed gear that has the same number of teeth as the first toothed gear. The first magnetic target and the second magnetic target can have the same number of magnetic structures as each other. The magnetic torque sensor system can include a shaft that includes a first shaft portion coupled to the first magnetic target and a second shaft portion coupled to the second magnetic target, in which the first shaft portion and the second shaft portion are configured to rotate relative to each other. The magnetic torque sensor system can include a torsion element arranged to couple the first shaft portion to the second shaft portion, in which the torsion element is configured to twist by an amount that depends upon the amount of torque applied to the shaft.

The magnetic torque sensor system can include a third magnetic sensor sensitive to changes in the at least one magnetic field induced by a third magnetic target. The processing circuit can be configured to: detect a difference between measurements obtained from the first magnetic sensor and third magnetic sensor; and generate shaft rotation angle information associated with a rotation angle of the shaft based on the detected difference between measurements obtained from the first magnetic sensor and third magnetic sensor. The magnetic torque sensor system can include the first magnetic target and the third magnetic target. The first magnetic target can include a first toothed gear, and the third magnetic target can include a third toothed gear having a different number of teeth than the first toothed gear. The first magnetic target and the third magnetic target can have different numbers of magnetic structures than each other. The magnetic torque sensor system can include a fourth magnetic sensor sensitive to changes in the at least one magnetic field induced by a fourth magnetic target, in which the processing circuit is configured to generate a turn count of the shaft based on one or more measurements from the fourth magnetic sensor.

The first magnetic sensor can be a magnetoresistive sensor.

Another aspect of this disclosure is a magnetic sensor system that includes at least one bias magnet configured to produce at least one magnetic field, a first magnetic sensor sensitive to changes in the at least one magnetic field induced by a first magnetic target, a second magnetic sensor sensitive to a second change in the magnetic field induced by a second magnetic target, and a processing circuit in communication with the first magnetic sensor and the second magnetic sensor. The processing circuit is configured to detect a difference between measurements obtained from the first magnetic sensor and the second magnetic sensor; and generate shaft rotation angle information associated with a rotation angle of a shaft based on the detected differences between measurements obtained from the first magnetic sensor and the second magnetic sensor.

The magnetic sensor system can include the first magnetic target and the second magnetic target. The first magnetic target can include a first toothed gear, and the second magnetic target can include a second toothed gear having a different number of teeth than the first toothed gear. The first magnetic target and the second magnetic target can have different numbers of magnetic structures than each other.

The magnetic sensor system can include a multi-turn magnetic sensor. The processor can output a turn count corresponding to more than one turn of the shaft based on an output of the multi-turn magnetic sensor.

Another aspect of this disclosure is a method of measuring torque applied to a shaft that includes first and second shaft portions coupled together. The method includes obtaining, from a first magnetic sensor, a first magnetic field measurement associated with rotation of the first shaft portion. The first magnetic field measurement is representative of changes induced by a first magnetic target in at least one magnetic field produced by at least one bias magnet. The method includes obtaining, from a second magnetic sensor, a second magnetic field measurement associated with rotation of the second shaft portion. The second magnetic field measurement is representative of changes induced by a second magnetic target in the at least one magnetic field produced by the at least one bias magnet. The method includes generating, with a processing circuit, a measure of torque applied to the shaft based on the first magnetic field measurement and the second magnetic field measurement.

The method can include generating, with the processing circuit, shaft rotation angle information based on a difference between the second magnetic field measurement and a third magnetic field measurement.

The method can include generating, with the processing circuit, a turn count associated with more than one turn of the shaft based on an output from a multi-turn magnetic sensor.

The method can include providing the measure of torque to an electric power assisted steering controller arranged to control a steering system.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate specific embodiments and are not intended to be limiting.

DETAILED DESCRIPTION

Figure 1A:
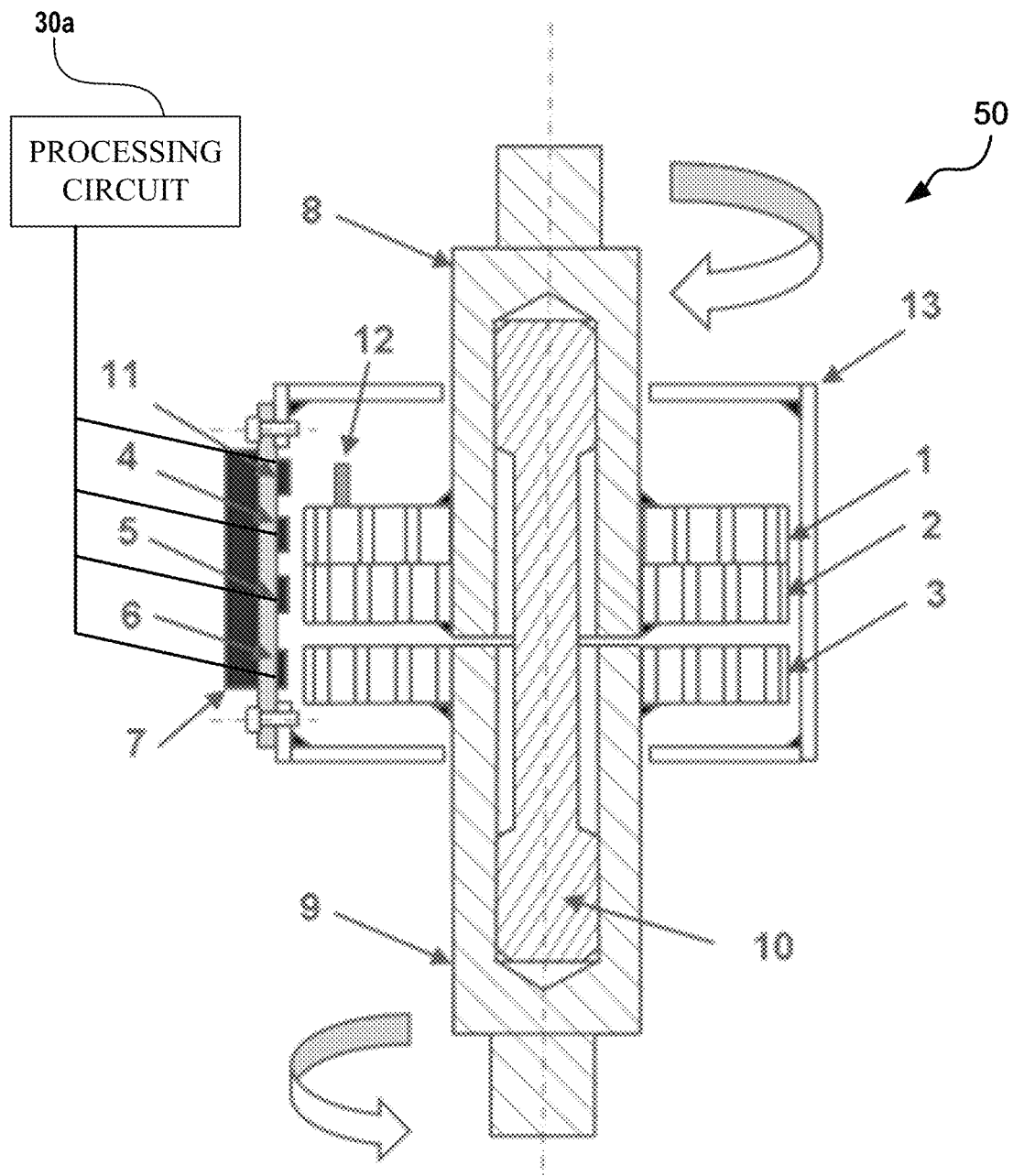
FIG. 1A is a schematic diagram of a magnetic sensor system that includes sensors for measuring torque, angle of rotation, and turn count of a pair of coupled shaft portions according to an embodiment.

The following detailed description presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The magnetic field sensing systems described herein can provide a simplified, compact and modular arrangement for measuring torque, position (e.g., angle), turn count, or any combination thereof in various applications. Example applications for the disclosed magnetic field sensors include, but are not limited to, measuring torque applied to a steering column, as well as the steering column's rotation speed, rotation angle, and/or turn count. Such information may be utilized as part of an electric power assisted steering (EPAS) system to provide desired properties, such as variable power assistance and/or dampening. The magnetic field sensing systems disclosed herein can include any suitable magnetoresistive (xMR) sensing elements.

Figure 1B:
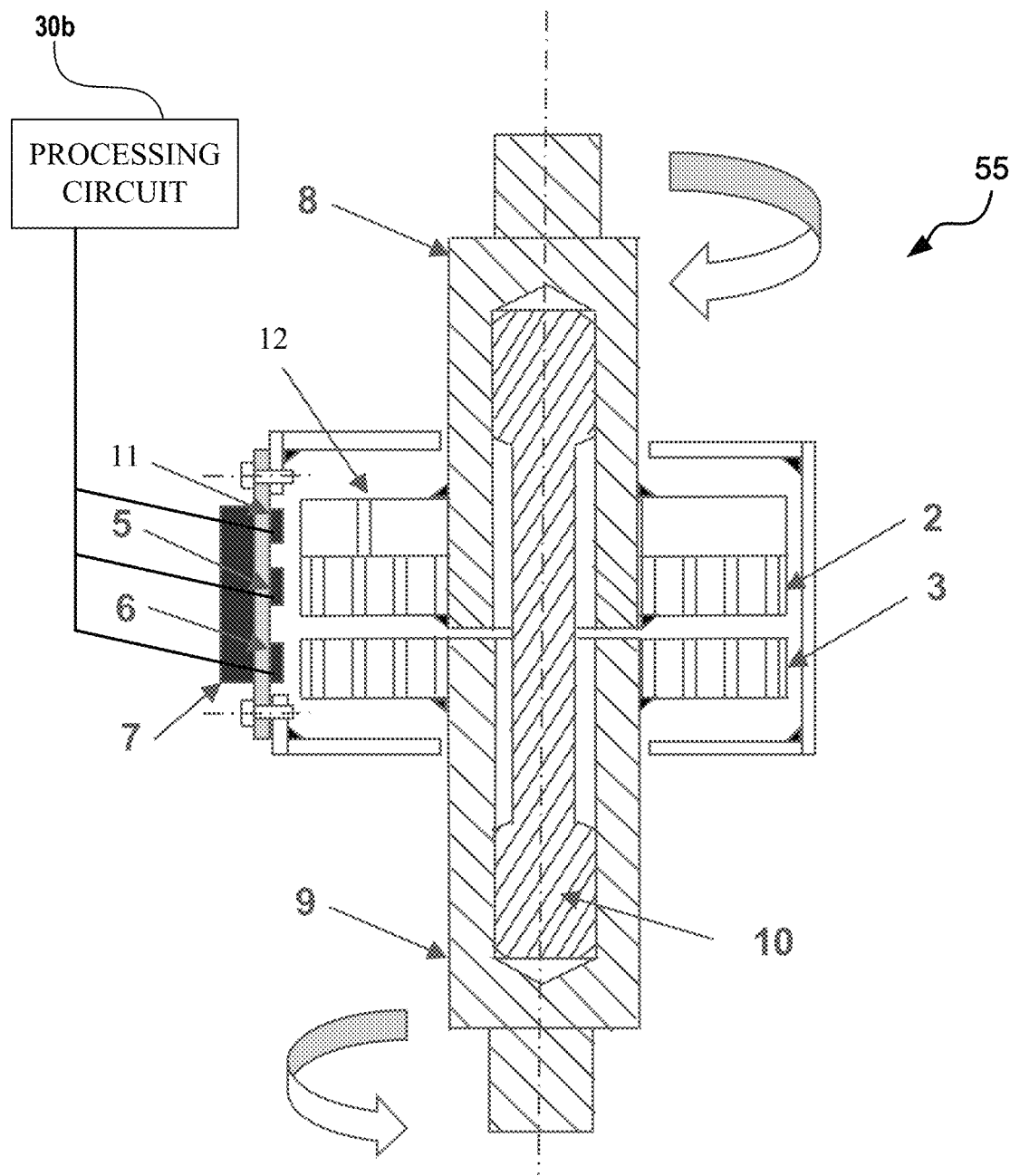
FIG. 1B is a schematic diagram of a magnetic sensor system that includes sensors for measuring torque and turn count of a pair of coupled shaft portions according to an embodiment.
Figure 1C:
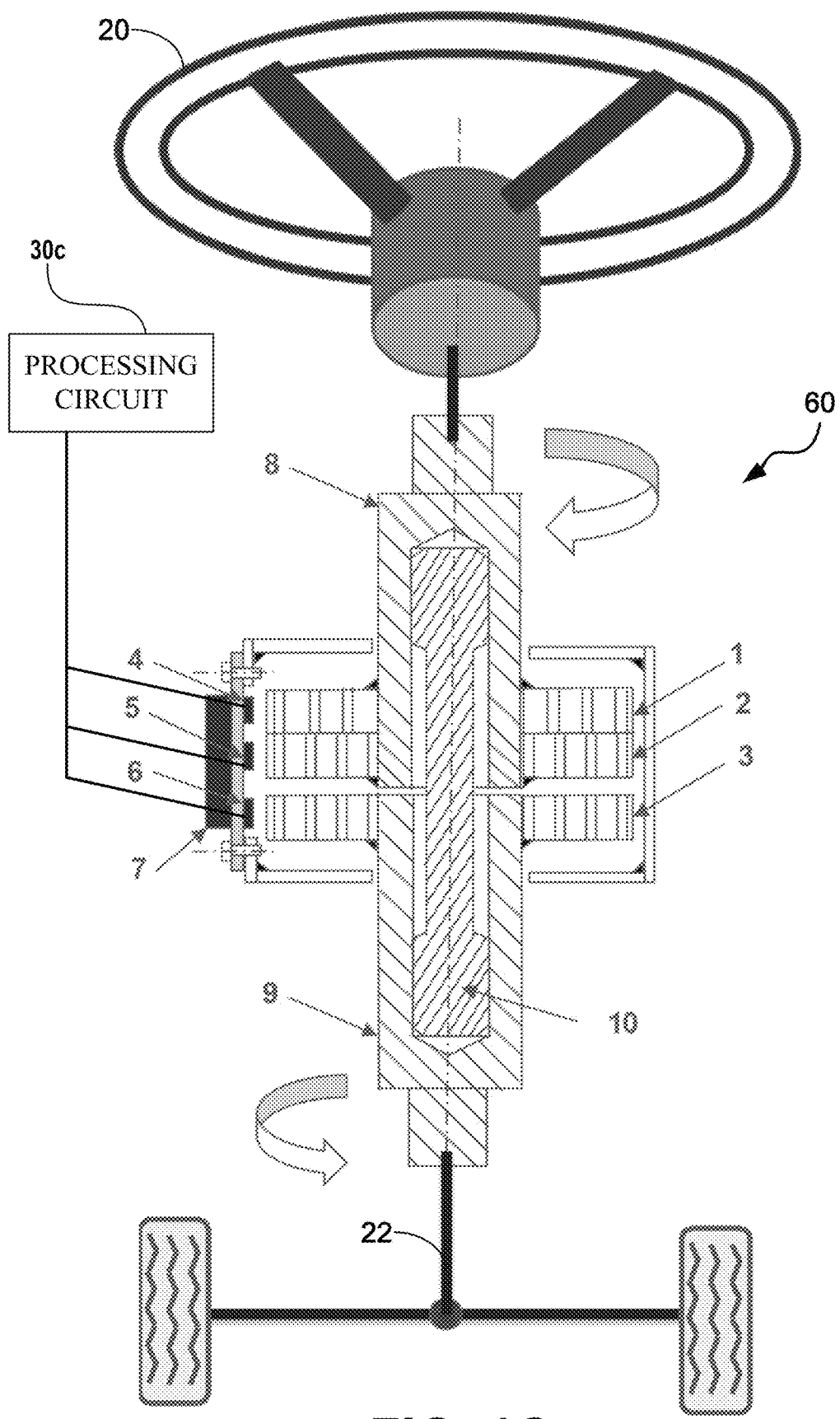
FIG. 1C is a schematic diagram of a magnetic sensor system that includes sensors for measuring torque and angle of rotation of a pair of coupled shaft portions and illustrating how the shafts may be part of an automotive steering system according to an embodiment.

Magnetic sensor systems disclosed herein can measure torque, angle of rotation, and turn count. For example, FIG. 1A is a schematic diagram of a magnetic sensor system 50 that includes sensors for measuring torque, angle of rotation, and turn count of a pair of coupled shafts according to an embodiment. In some embodiments, a magnetic sensor system can measure torque and turn count without measuring angle. For instance, FIG. 1B is a schematic diagram of a magnetic sensor system 55 that include sensors for measuring torque and turn count of a pair of coupled shafts according to an embodiment. According to certain embodiments, a magnetic sensor system can measure torque and angle without measuring turn count. For instance, FIG. 1C is a schematic diagram of a magnetic sensor system 60 that include sensors for measuring torque and turn count of a pair of coupled shafts according to an embodiment. Any suitable combination of features of FIGS. 1A to 1C can be implemented together with each other.

A magnetic sensor system 50 including magnetic field sensors for measuring torque, position, and/or turn count is depicted in FIG. 1A. System 50 may include elements, further described below, such as magnetic targets 1, 2, and 3; magnetic sensors 4, 5, and 6; bias magnet 7; first and second shaft portions 8 and 9 coupled together via torsion element 10; magnetic sensor 11 and magnetic feature 12; sensor module 13; and processing circuit 30a. In general, system 50 including sensor module 13 may be modular and may include or exclude any of the aforementioned sensors and/or targets for measuring torque, shaft angle of rotation, and number of shaft rotations.

As depicted in FIG. 1A, the system 50 may include a torsion element 10 having a known torsional stiffness and situated between a first shaft 8 and a second shaft 9, which are free to rotate about each other and which are sometimes referred to as first and second shaft portions, respectively. A shaft can include the first shaft 8 as a first shaft portion and the second shaft 9 as the second shaft portion. The torsional stiffness of the torsion element may also be referred to as a torsion coefficient such that the torque applied to the torsion element is proportional to the torsion coefficient and the angle of twist of the torsion element. The system 50 may include a flexible coupling device, coupling together shafts 8 and 9, other than a torsion element such as torsion bar 10. As an example, system 10 may include a spring, coil, or other element that is compressed or stretched with applied torque. These are merely illustrative examples.

As shown in FIG. 1A, the system 50 may include magnetic targets 1, 2, 3 in the form of gears. A magnetic feature 12 can be included on one of the magnetic targets. Magnetic targets 1 and 2 may be rigidly mounted to the upper shaft section 8 and magnetic target 3 may be mounted to the lower output shaft 9. In general, it may be desirable to mount magnetic target gears such as targets 1, 2, and 3 to be substantially parallel to one another. In other words, targets 1, 2, and 3 may lie in substantially parallel planes. In at least some embodiments, magnetic target 1 has a different number of teeth than target 2, to facilitate measuring a current rotation angle of the upper shaft 8. As an example, target 2 may have n teeth and target 1 may have n−1 or n+1 teeth. Additionally, it may be desirable for magnetic targets 2 and 3 to have the same number of teeth, to facilitate measuring an amount of torque applied to torsion element 10 via shafts 8 and 9. Additional details of how to measure torque, position, and/or turn count are discussed in more detail herein.

While the magnetic targets 1, 2, 3, and 12 may sometimes be referred to herein as gears, the magnetic targets may, in general, be any suitable structures. As a first example, one or more of the magnetic targets may be formed from individual structures attached to one of the shafts 8 and 9, as opposed to a single gear having teeth. As a second example, one or more of the magnetic targets may be formed from a disc or ring having structures other than teeth, such as protrusions above or below the plane of the disc. As a third example, one or more of the magnetic targets may be formed from a structure having variable magnetic properties; such as a ring formed of non-magnetic materials but with embedded or attached magnetic structures arranged in a manner sufficient to produce measurable changes in magnetic field direction and accomplish desired goals such as sensing at least one of torque, shaft rotation angle, and turn count. In general, the magnetic targets disclosed herein may include magnetic structures of any type, including teeth, protrusions, embedded magnetic materials, varying internal structure or materials, etc. Additionally, the magnetic structure may be arranged in a manner sufficient to produce measurable changes in magnetic field direction and accomplished desired goals such as sensing torque, rotation angle, and turn count.

As torque is applied to one or both of shafts 8 and 9, torsion bar 10 twists in order to transmit the torque through the system (i.e., to the receiving shaft 8 or 9). As torsion bar 10 twists, target gears 2 and 3 rotate relative to each other. As the torque applied to torsion bar 10 increases, the target gears 2 and 3 rotate further relative to each other in an amount approximately equal to the twisting of torsion bar 10 (which may be proportional to the torque applied to torsion bar 10). Moreover, the rotation of target gears 2 and 3 relative to each other can be measured by measuring the displacement of the teeth on target gear 2 relative to the teeth on target gear 3. Thus, the relative rotation (i.e., displacement) between target gears 2 and 3 may be indicative of the torque applied to upper shaft 8 (or, when the lower shaft 9 is a source of input torque, the torque applied to lower shaft 9). More generally, the relative rotation between target gears 2 and 3 may be indicative of the torque being transmitted between shafts 8 and 9. As noted herein, shafts 8 and 9 may be elements conveying torque in any suitable system and are not limited to the automotive applications described herein.

In at least some embodiments, system 50 may include hard stops that prevent relative rotation between the two shafts 8 and 9 from exceeding some predetermined amount. As an example, the system may include hard stops that prevent shaft 8 from rotating more than about 3.0°, 3.5°, 4.0°, or 4.5° degrees relative to shaft 9 (in either direction). In some embodiments, the system may include a hard stop that prevents shaft 8 from rotating more than a small amount (e.g., 0.0°, 0.5°, or 1.0°, or more) in a first direction, while allowing shaft 8 to rotate a larger amount (e.g., 3.0°, 3.5°, 4.0°, or more) in a second direction opposite the first. Such hard stops may serve to protect torsion bar 10 from damage due to excessive applied torque. In such embodiments, system 50 may not be able to accurately measure torque levels above an amount sufficient to engage the hard stops.

System 50 may include a sensor module 13 including magnetic field direction sensors 5, 6 positioned facing the teeth of target gears 2, 3 and a biasing magnet 7 may be positioned behind the magnetic field direction sensors 5, 6. The sensor module 13 including sensors 5, 6 and bias magnet 7 may be disposed remotely from the assembly of shafts 8 and 9 and torsion bar 10 and may not rotate with either of shafts 8 and 9. The bias magnet 7 and the illustrated magnetic sensors can be stationary as the shaft rotates. Magnetic field lines from biasing magnet 7 may pass through sensors 4, 5, 6, and 11 and become distorted as a target gear tooth from one of target gears 1, 2, or 3 (or a magnet feature such as magnetic feature 12) passes by its respective sensor. As an example, as the shafts 8 and 9 are rotated (e.g., as a user turns the steering wheel), various teeth of target gear 1 may pass by sensor 4, thereby distorting the magnetic field lines emanating from the biasing magnet 7. This distortion or magnetic field line direction change may be measured by the field direction sensors 4, 5, 6, and 11. By comparing the relative field line directional changes from sensors 5 and 6, the angle of rotation or twist of target gear 3 relative to target gear 2 can be measured and from that the torque applied to the assembly derived, using various signal processing techniques.

The magnetic sensor system 50 of FIG. 1A can also include a processing circuit 30a. The processing circuit 30a may be disposed within, adjacent to, or remotely away from the sensor module 13 and may receive signal(s) from magnetic sensors 4, 5, 6, and 11. The processing circuit 30b may convert signals from the magnetic sensors into shaft turn count, shaft rotation angle, and torque measurements.

Embodiments utilizing a biasing magnet, such as biasing magnet 7, and magnetic targets that distort, alter, modify, or otherwise change magnetic fields from the biasing magnet, may have advantages over embodiments using magnetic targets that are permanently magnetized and that themselves produce magnetic fields. As an example, a suitable biasing magnetic and magnetic targets that distort magnetic fields generated by a biasing magnet may be relatively inexpensive compared to permanently magnetized magnetic targets that produce suitable magnetic fields. In other words, systems utilizing magnetically active targets may be more expensive to provide and less reliable than systems utilizing magnetically passive targets, which merely distort, alter, modify, or otherwise change magnetic fields passing near or through the magnetically passive targets.

In some embodiments, magnetic sensor systems such as systems 50, 55, and 60 of FIGS. 1A-1C may include more than one bias magnet. As an example, the magnetic sensor systems disclosed herein may be provided with one bias magnet per magnetic target or feature. As another example, the magnetic sensor systems disclosed herein may be provided with multiple bias magnets, at least one of which produces magnetic fields that are distorted or otherwise influenced by two or more magnetic targets or features, with such distortions being detected by two or more magnetic sensors. In some situations, it may be beneficial to provide two or more bias magnets. As an example, the sensor module 13 could be split into two components, one or both of which could be moved away from the coupling between shaft portions 8 and 9.

The magnetic field direction sensors such as sensors 4, 5, 6 and 11 can be based on, but are not limited to, Anisotropic Magneto Resistive (AMR) sensor elements, Giant Magneto Resistive (GMR) sensor elements, any magnetoresistive sensing elements (xMR), Tunnel Magneto Resistive sensor elements, or other suitable technologies. In some embodiments, the sensors may provide Sine and Cosine outputs.

In other embodiments, the sensor module 13 may be mounted to shaft 8 (or shaft 9) and may rotate along with shaft 8 (or shaft 9). In such embodiments, the torque applied to torsion bar 10 may be determined using a single magnetic field direction sensor and a single magnetic target. As an example, sensor module 13 could be rigidly mounted to shaft 9. Then, using magnetic sensor 5 and a magnetic target affixed to shaft 9 (such as target gear 2), the sensor module 13 could identify the relative rotation between shafts 8 and 9 and thus the torque applied to the system.

In various embodiments, sensor module 13 may include one or more sensors and one or more targets configured to measure the angle of rotation of the assembly (e.g., the rotation position between 0° and 360° of shaft 8 and/or shaft 9). As an example, gears 1 and 2 may be affixed to input shaft 8 and may rotate together with rotation of input shaft 8. In addition, target gear 1 may have more or fewer teeth than target gear 2. As an example, target gear 2 may have n teeth, while target gear 1 may have n−1 or n+1 teeth. In such an example, the Nonius principle applies and the absolute angle of rotation of both gears 1 and 2 can be inferred by measuring the relative displacement of teeth on target 1 with teeth on target 2 at the position of sensors 4 and 5). In particular, when target gears 1 and 2 differ in number of teeth by one, the relative offset between adjacent teeth of gears 1 and 2 at the position of the magnetic sensors 4 and 5 uniquely varies for an entire rotation of the shaft 8. Thus, by comparing measurements from sensors 4 and 5, the absolute angle of rotation of input shaft 8, between 0° and 360°, can be measured.

In still other embodiments, sensor module 13 may include one or more sensors and one or more targets configured to measure the number of rotations of the shaft assembly. Such sensors and targets may be referred to herein as a turn counter. In the automotive context, the turn counter may indicate how many times wheel 20 has been rotated 360° from a 0° position. As an example, many automobiles permit a driver to rotate a wheel approximately 3.5 times from the left hard stop to the right hard stop (thus the driver can rotate the wheel a little over 1.5 times from dead center to one of the left or right hard stops). When combined with a rotation position sensor (such as gears 1, 2 and sensors 4, 5), a turn counter may provide a indicate how many times the wheel has been fully rotated along with the current rotation, thus giving an exact indication of the steering position of the wheels.

Sensor module 13 may measure rotations of the shaft assembly using one or more magnetic targets such as magnetic feature 12 and one or more sensors such as sensor 11. In some embodiments, magnetic feature 12 may be a magnetic element extending from one of the target gears and configured to change the magnetic field line direction (of the field lines generated by bias magnet 7). The sensor 11 may detect changes in the magnetic field line direction as the magnetic target 12 passes the sensor. Various signal processing techniques may be utilized to recognize completion of half turns and/or full turns of the shaft assembly and record the number of turns. (In some embodiments, the turn counter may increase a count of the completed turns when recording completion of a full rotation of shafts 8 and/or 9 in a first direction, and may decrease the count of the completed turns when recording completion of a full rotation in a second, opposite direction. Negative turn counts may represent completed full rotations in the second direction.)

FIG. 1B depicts another magnetic sensor system 55, similar to system 50 of FIG. 1A, but excluding components for measuring shaft angle of rotation. As shown in FIG. 1B, magnetic sensor system 55 may include elements, further described herein, such as magnetic targets 2 and 3; magnetic sensors 5 and 6; bias magnet 7; first and second shaft portions 8 and 9 coupled together via torsion element 10; magnetic sensor 11 and magnetic feature 12; sensor module 13; and processing circuit 30b. The processing circuit 30b may be disposed within, adjacent to, or remotely away from the sensor module 13 and may receive signal(s) from magnetic sensors 5, 6, and 11. The processing circuit 30b may convert signals from the magnetic sensors into shaft turn count and torque measurements.

FIG. 1C depicts another magnetic sensor system 60, similar to system 50 of FIG. 1A, but excluding components for measuring the number of shaft rotations (e.g., excluding turn counting components). As shown in FIG. 1C, magnetic sensor system 60 may include elements, further described herein, such as magnetic targets 1, 2, and 3; magnetic sensors 4, 5, and 6; bias magnet 7; first and second shaft portions 8 and 9 coupled together via torsion element 10;

sensor module 13; and processing circuit 30c. The processing circuit 30c may be disposed within, adjacent to, or remotely away from the sensor module 13 and may receive signal(s) from magnetic sensors 4, 5, and 6. The processing circuit 30c may convert signals from the magnetic sensors into shaft rotation angle and torque measurements.

FIG. 1C also illustrates that the first shaft 8 may be an upper input shaft coupled to a steering wheel 20 and the second shaft 9 may be a lower output shaft coupled to a steering system 22 (or vice-versa). In addition, there may be an EPAS system including a controller and one or more motors coupled to the second shaft 9 and/or the steering system 22. The EPAS system may use information from the disclosed magnetic field sensors in providing EPAS functionality, such as variable power assistance, dampening, and automated steering functionality such as lane keeping, automated parking, automated driving, etc. Steering wheel 20 and steering system 22 have been omitted from FIGS. 1A and 1B for the sake of simplicity. Additionally and as previously noted, systems such as systems 50, 55, and 60 may be incorporated into a variety of applications, not limited to automotive applications.

Figure 2A:
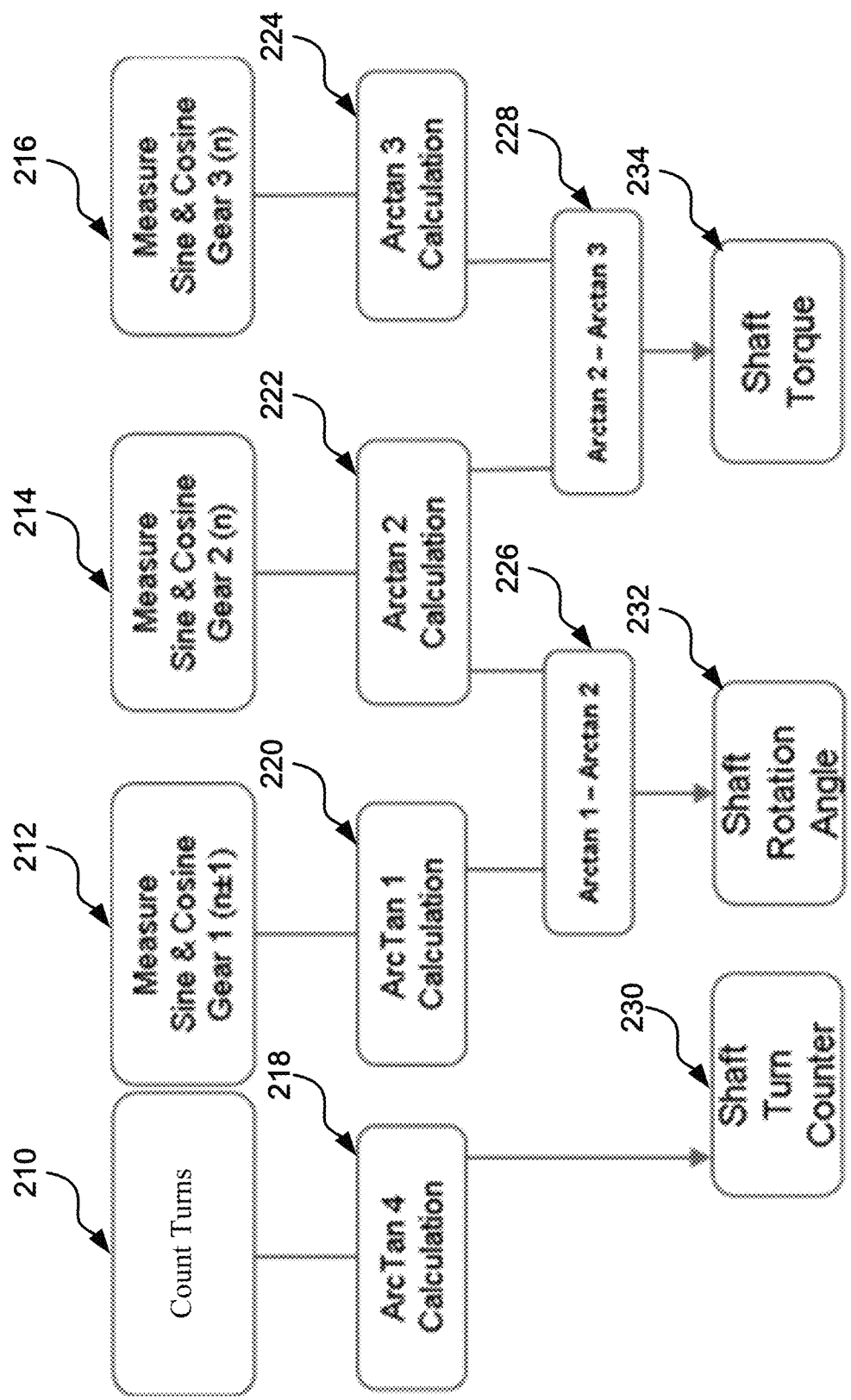
FIG. 2A is a flow diagram of processes for measuring shaft torque, rotation angle, and turn count using a magnetic sensor according to an embodiment.

A flow diagram of a process for measuring shaft torque, rotation angle, and turn count is shown in FIG. 2A. As discussed herein, target gears 1, 2, and 3 and target feature 12 may induce changes, which can be measured by corresponding sensors such as sensors 4, 5, 6, and 11, in a magnetic field, which may be generated by bias magnet 7. These measurable changes may be indicative of the torque applied to one or more shafts, as well the rotation angle and turn count of said shafts.

In operations 210, 212, 214, and 216, sensors 4, 5, 6, and 11 may detect measurable changes in the magnetic field direction passing through the sensors, as a result of one or more of the targets 1, 2, 3, and 12 (i.e., feature 12 and gears 1, 2, 3) rotating and interacting with the magnetic field generated by bias magnet 7. As described in further detail herein (see, e.g., FIG. 5B and the text accompanying FIG. 5B), operations 210-216 may include measuring the trigonometric sine and cosine of the rotation (e.g., orientation) of the magnetic field passing through one or more of the respective sensors 11, 4, 5, and 6.

Operation 210 may involve counting turns of a rotating shaft such as shaft 8 or 9 using a multi-turn counter based on magnetic field changes from magnetic feature 12. As an example, operation 210 may involve generating, destroying, and/or moving domain walls within a magnetic strip to record turns, as further discussed herein including in connection with FIG. 5A. Operation 212 may involve measuring the sine and cosine (e.g., the orientation) of the magnetic field passing through sensor 4. Operation 214 may involve measuring the sine and cosine (e.g., the orientation) of the magnetic field passing through sensor 5. Operation 216 may involve measuring the sine and cosine (e.g., the orientation) of the magnetic field passing through sensor 6.

In operations 218, 220, 222, and 224, the angle of the magnetic field passing through the sensors may be determined from the sine and cosine signals of the rotation of the magnetic field measured in operations 210-216. In particular, calculation 218 may involve finding the arctangent or "arctan" (i.e., the sine value divided by the cosine value) of the measurements taken by sensor 11 and associated with target 12. Similarly, calculations 220, 222, and 224 may involve finding the artcans of the respective measurements taken by sensors 4, 5, and 6 and associated with respective targets 1, 2, and 3.

Operation 218 may involve finding the arctan of sin and cosine measurements taken by sensor 11 in operation 210. Operation 220 may involve finding the arctan of sin and cosine measurements taken by sensor 4 in operation 212. Operation 222 may involve finding the arctan of sin and cosine measurements taken by sensor 5 in operation 214. Operation 224 may involve finding the arctan of sin and cosine measurements taken by sensor 6 in operation 216.

In operation 226, a difference between the arctan values determined in operations 220 and 222 may be determined. As discussed previously, the difference in the number of teeth (or other features that induce a change in the magnetic field) between target gears 1 and 2 results in a unique phase shift at every angle of rotation (e.g., between 0° and 360°). As such, it is the unique phase shift, or the differences in direction of the two magnetic fields sensed by sensors 4 and 5 (and associated gears 1 and 2) that may be used to calculate the shaft rotation angle (rather than the field direction sensed by an individual one of sensors 4 and 5). Thus, determining the difference between the arctan values, as part of operation 226, enables determination of the shaft rotation angle in operation 232. In particular, operation 232 may involve mapping the measured difference between the magnetic fields at sensors 4 and 5 to a predetermined mapping of such differences to shaft rotation angles. As discussed, the differences between the magnetic fields at sensors 4 and 5 may vary continuously and uniquely across the entire range of rotation (e.g., between 0° and 360°) and may only repeat after completion of a full turn. Additionally, by tracking shaft rotation angle over time, the system may be able to identify the direction, velocity, and acceleration of the shaft rotation.

The system 50 may identify a zero rotation angle (which may be associated with a straight-line steering direction, in the automotive context) via a calibration process, which may occur as part of a setup process, as part of on-going real-time calibration, or some other calibration process. As an example, a controller in sensor module 13 or some other part of system 50 may identify a zero rotation angle by comparing measurements from sensors 4 and 5 to predetermined known or believed to be associated with a zero rotation angle position, which may be determined during a calibration process. As another example, the controller may monitor rotation angles over time and identify the zero rotation angle position based on an assumption that the statistical mode (or most frequent value) of rotation angle would be the zero angle (e.g., that cars drive straight more often than they turn), based on an assumption that the statistic mean (or average value) of rotation angle would be the zero angle, or other techniques for identifying a zero angle.

In operation 228, a difference between the arctan values determined in operations 222 and 224 may be determined. As discussed previously, torque applied to shaft 8 (or shaft 9) may cause a twisting of torsion bar 10 and a twisting of shaft 8 relative to shaft 9. Additionally, because gears 2 and 3 move with shafts 8 and 9, respectively, application of torque to shaft 8 (or shaft 9) may cause gears 2 and 3 to shift relative to each other by an amount that varies in relation to the magnitude of applied torque. As such, it is the phase shift, or the differences in direction of the two magnetic fields sensed by sensors 5 and 6 (and associated gears 2 and 3) that may be used to infer the torque applied to the system.

In some embodiments, it may be acceptable for gears 2 and 3 to be shifted relative to each other even when no torque is applied to the system. In such embodiments, a controller in sensor module 13 or some other part of system 50 may compensate for such offset via a calibration process.

In particular, the system may associate the zero torque condition with some particular phase difference in the magnetic fields passing through sensors 5 and 6 (caused by offset gears 2 and 3) and may measure torques by measuring differences from that baseline phase difference.

Thus, determining the difference between the arctan values, as part of operation 228, enables determination of the torque applied to the shaft 8 (or 9) in operation 234. In particular, operation 234 may involve determining the magnitude of the movement of gear 2 relative to gear 3, based on predetermined relationships between the gears, gear teeth, and their impacts on the magnetic fields passing through sensors 5 and 6. Operation 234 may also include inferring the torque applied to the system, based on the determined magnitude of the movement of gear 2 relative to gear 3 and predetermined attributes of the system such as the rigidity of torsion bar 10, the position of hard stops, etc.

As illustrated in FIG. 2A (as well as FIGS. 1A and 1C), measuring shaft rotation angle may involve, in some embodiments, measuring changes in magnetic field direction induced by two target gears (1 and 2). Similarly, measuring shaft torque may involve, in some embodiments, measuring changes in magnetic field direction induced by two target gears (2 and 3). However, it may be possible to utilize one of the gears (in the illustrated examples, gear 2) for both shaft rotation angle and torque measurements, thereby reducing the number of target gears utilized and the cost, size, and complexity of the resulting system.

In addition to the magnitude of the torque applied to the system, the system may be able to determine if torque is being applied to shaft 8 or shaft 9 (i.e., if the driver is trying to turn the wheel or if the steering system is trying to provide feedback to the driver through the wheel). In other words, the system may be able to determine the direction of applied torque and thus distinguish between a twisting of torsion bar 10 in a first direction and twisting in a second opposite direction. The system may identify the direction or source of the torque by analysing measurements from sensors 5 and 6. In particular, a negative value (or, more generally, a value lower than that associated with zero torque) obtained in calculation 228 may be determined to be associated with torque input to shaft 8 (or 9); while a positive value (or, more generally, a value higher than that associated with zero torque) obtained in calculation 228 may be determined to be associated with torque input to shaft 9 (or 8).

In operation 230, the number of complete shaft turns may be tracked over time. The arctan calculation of operation 218 (or other suitable calculation based on measurements from sensor 11) may be used in determining when a complete shaft turn has been completed. Additionally, the direction of the shaft turn may be determined based on the measurements from sensor 11, or measurements from other sensors (such as rotation sensors 4 and 5), or some combination therefore. In some embodiments, the system may record a completed turn in a first direction as a +1 turn and a completed turn in a second opposite direction as a −1 turn, thus allowing the system to easily keep track of how many times the shaft has been rotated away from a predetermined center position and in which direction the shaft was rotated.

Figure 3A:
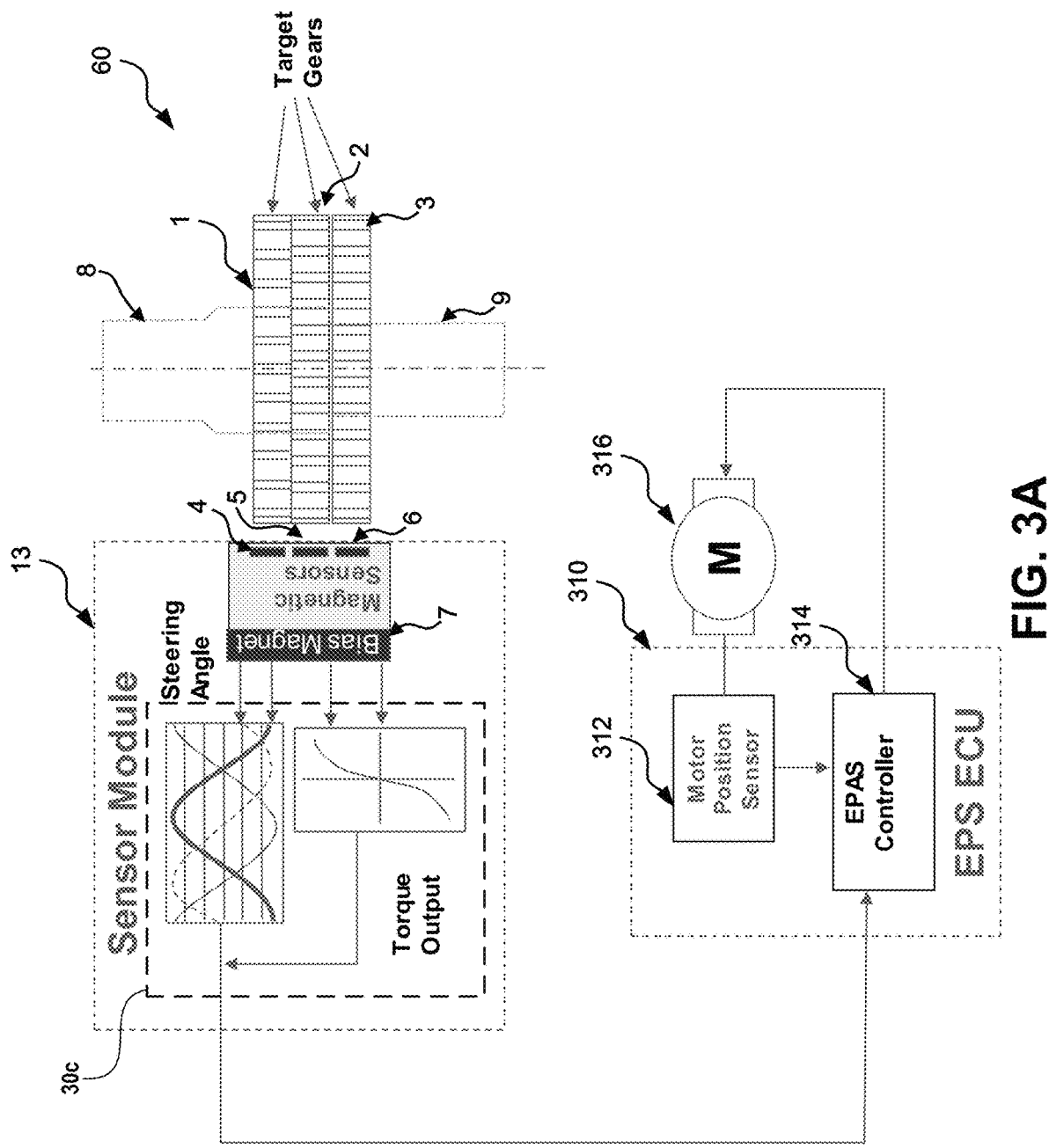
FIG. 3A is a schematic diagram of an electric power assisted steering (EPAS) system that utilizes a magnetic sensor system to detect steering angle and steering torque as part of providing electric steering assist according to an embodiment.
Figure 3B:
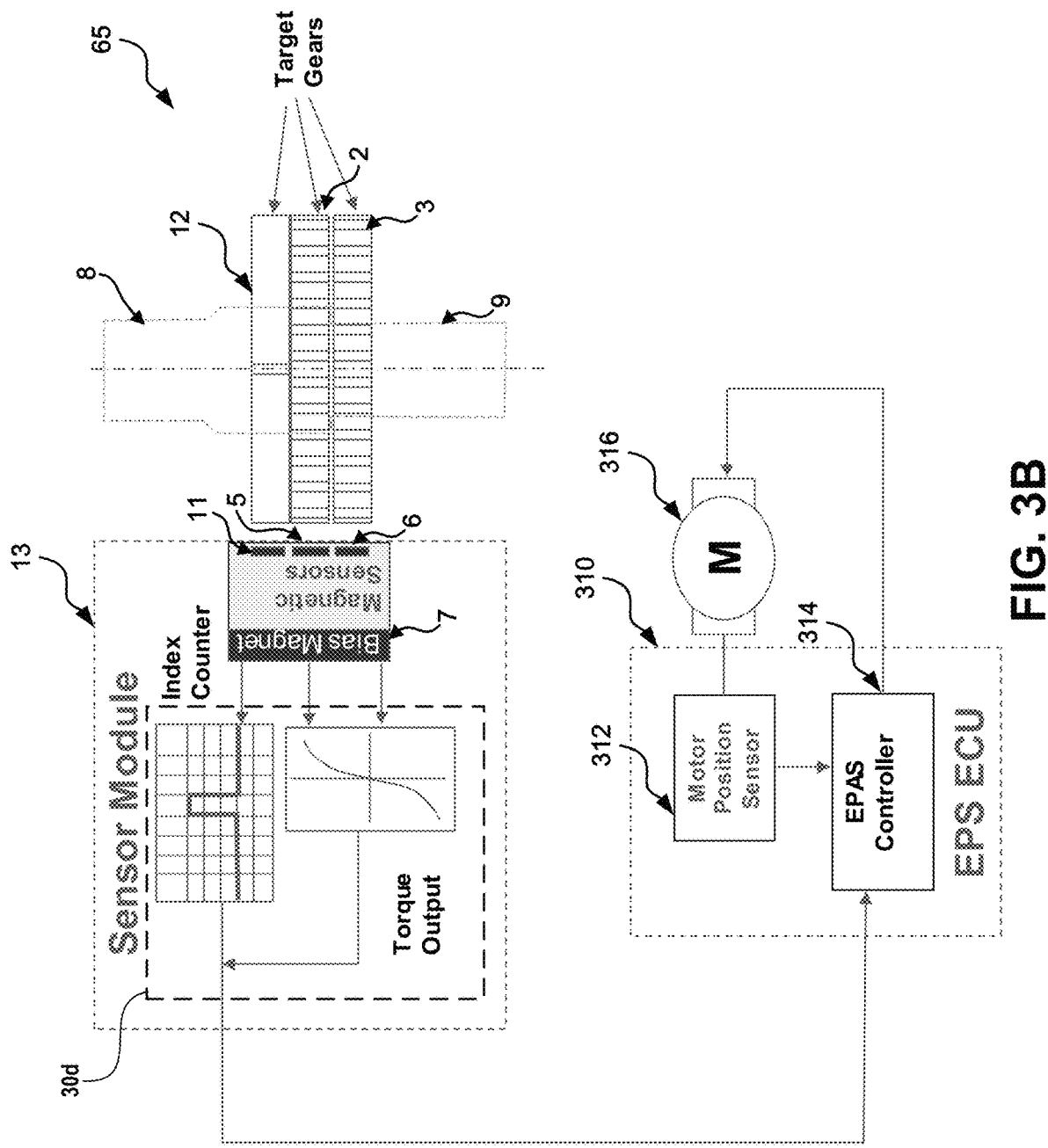
FIG. 3B is a schematic diagram of an EPAS system that utilizes a magnetic sensor system to detect steering torque and a steering wheel turn count as part of providing electric steering assist according to an embodiment.
Figure 3C:
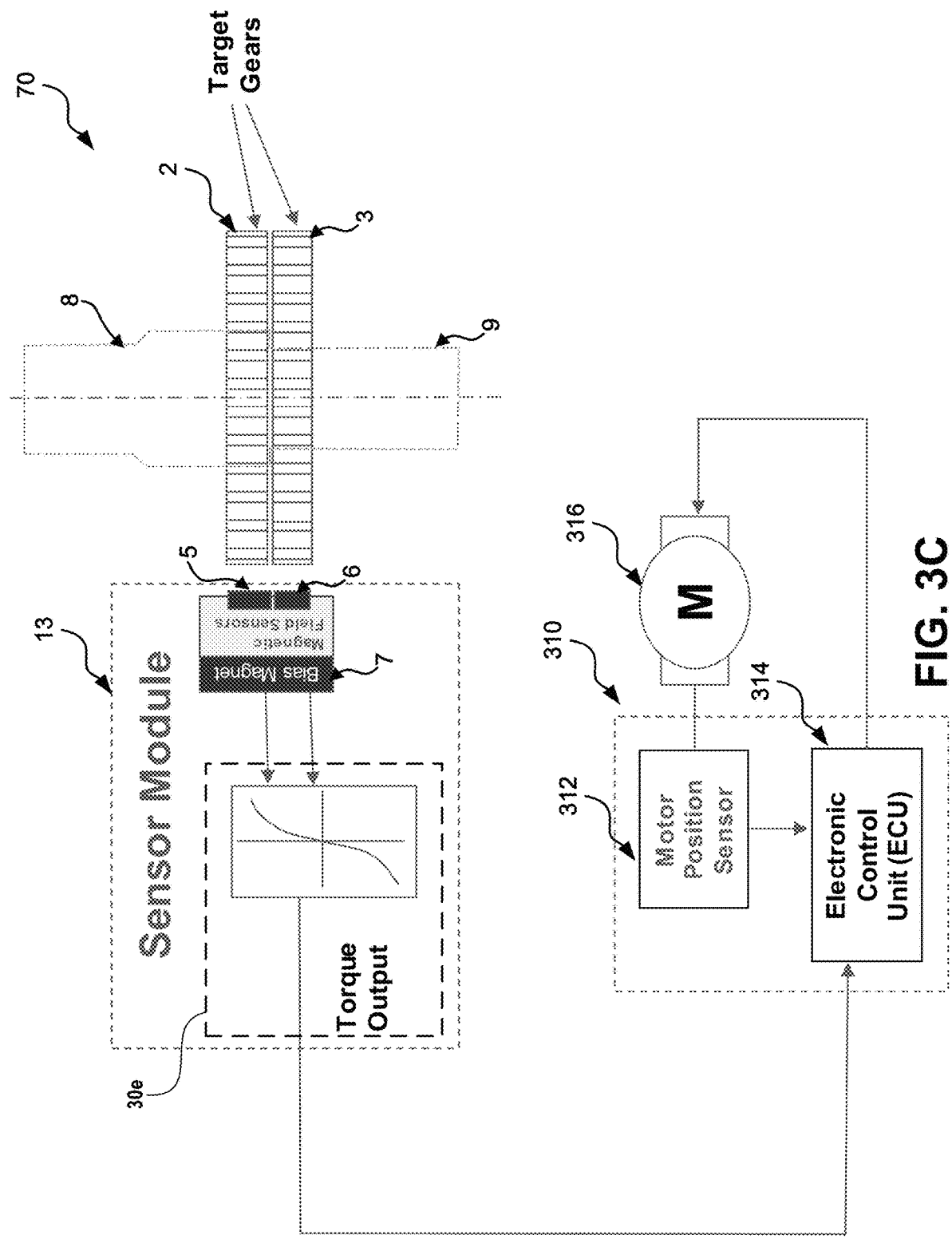
FIG. 3C is a schematic diagram of an EPAS system that utilizes a magnetic sensor system to detect steering torque as part of providing electric steering assist according to an embodiment.

FIGS. 3A, 3B, and 3C illustrate how information obtained by magnetic sensing systems, such as the torque applied to the shafts, the rotation angle, and the number of completed turns may be utilized by another system such as an electric power assisted steering (EPAS) system. In particular, information from a magnetic sensing system may be utilized by an electric power steering (EPS) electronic control unit (ECU) 310 and, in particular may be utilized by an EPAS controller 314, to control an electric assist motor 316. The electric assist motor 316 may be coupled to the steering system 22. Additionally, the EPAS controller 314 may receive feedback on motor position using motion position sensor 312. Sensor 312 may utilize techniques of the type described herein to sense rotation angle of the electric motor 316 (which may contain at least one shaft comparable to shaft 8 or 9).

In at least some embodiments, EPAS controller 314 may vary operation of the electric assist motor 316 in response to one or more of torque, rotation angle, and the number of completed turns measuring by a magnetic sensing system. As an example, when sensor module 13 detects relatively high levels of torque on input shaft 8 (by detecting the direction of torque as described herein), EPAS controller 314 may respond by commanding motor 316 to provide a high level of electric assistance in the direction of shaft rotation (determined as part of process 232).

FIG. 3A illustrates a magnetic sensing system 60 of the type illustrated in FIG. 1C, which includes a sensor module 13 at least with components configured for sensing torque and shaft rotation angle, which may also be referred to as torque output and steering angle. As shown in FIG. 3A, system 60 may also include a processing circuit 30c that receives signals from the magnetic sensors 4, 5, and 6, that calculates torque and steering angle, and that transmits the measured torque and steering angle to the EPS ECU 310 or to another desired component.

FIG. 3B illustrates a magnetic sensing system 65, which includes a sensor module 13 at least with components configured for sensing torque and shaft turn count, which may also be referred to as torque output and index counter. As shown in FIG. 3B, system 65 may also include a processing circuit 30d that receives signals from the magnetic sensors 5, 6, and 11, that calculates torque and turn count, and that transmits the measured torque and turn count to the EPS ECU 310 or to another desired component.

FIG. 3C illustrates a magnetic sensing system 70, which includes a sensor module 13 at least with components configured for sensing torque, which may also be referred to as torque output. As shown in FIG. 3C, system 70 may also include a processing circuit 30e that receives signals from the magnetic sensors 5 and 6, that calculates torque, and that transmits the measured torque to the EPS ECU 310 or to another desired component.

Additional details of magnetic sensors, such as those used in measuring torque, rotation angle (and direction, velocity, and acceleration), and turn count are described below and illustrated in FIGS. 4, 5A, and 5B.

Magnetic sensors can be used to monitor the angular position and rotational velocity of a moving shaft. Such magnetic sensing can be applied to a variety of different applications, such as automotive applications, medical applications, and industrial control applications, among others. Several technologies exist for making magnetic sensors. For instance, there are Hall-effect sensors. Hall-effect sensors can generate direct current (DC) output voltages based on the strength of an applied magnetic field. A rotating magnetic field creates sinusoidal waveforms in Hall-effect sensors which can then be processed by a computer to calculate angle. There are also giant magnetoresistance (GMR) sensors. In a GMR sensor, GMR resistors are formed using layers of ferromagnetic and non-magnetic materials. The GMR resistors can be used in Wheatstone bridges to sense variations in rotating magnetic fields. AMR sensors can be used to measure angular position. Such AMR sensors can be arranged in full bridges.

Magnetic sensors can be integrated on a chip for sensing and recording the number of turns in half-turn increments, in which states can change every quarter turn, or for sensing the angle of a rotating magnetic field. A magnetic sensor for sensing and recording the number of turns in quarter-turn increments can be referred to as a multi-turn (MT) sensor. A magnetic sensor for sensing the rotational angle over a range of 360 degrees can be referred to as an angle sensor or as a single turn (360 degrees) angle sensor. Both a multi-turn sensor and an angle sensor can be used together to determine the rotational angle position that exceeds 360 degrees. This combination of a multi-turn sensor with an angle sensor can also be referred to as a multi-turn angle sensor.

Additional circuitry can be used to process and/or convert signals from the multi-turn sensor and the angle sensor into useful information. For instance, an analog-to-digital converter (ADC) can be used to convert voltages from the sensors into digital data that can be processed into the overall rotational angle position and/or angular velocity.

Figure 4:
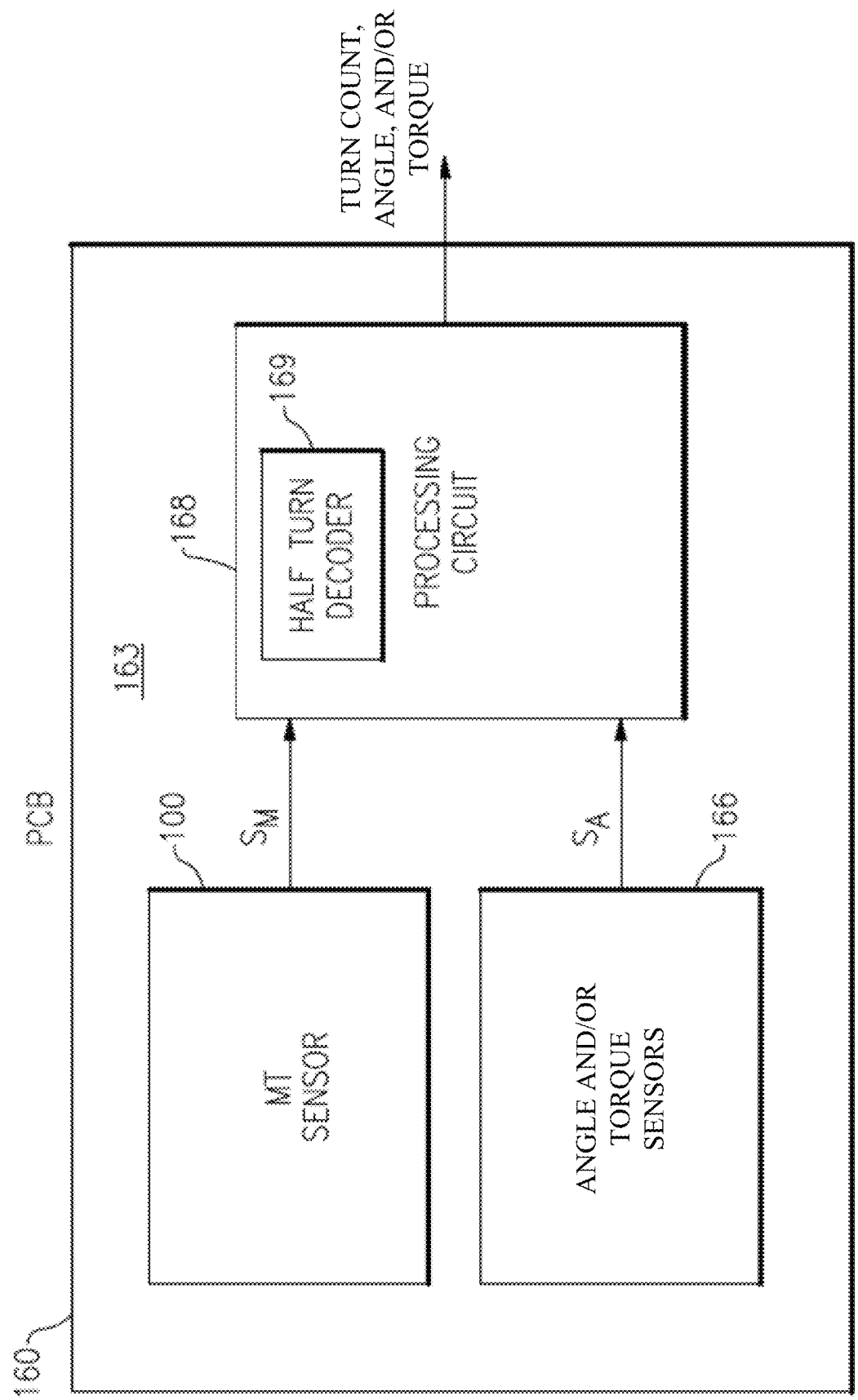
FIG. 4 is a schematic block diagram of a magnetic sensor system that includes a multi-turn sensor and an angle sensor according to an embodiment.

FIG. 4 is a schematic block diagram of a magnetic multi-turn angle sensor system 160 that includes a multi-turn (MT) sensor 100 and an angle and/or torque sensors 166 according to an embodiment. Sensor 100 may include sensor 11, which is described further at least in connection with FIG. 1A, and can be used to measure and/or record a turn count, a half-turn count, or some other fractional or multiple count of rotations of a shaft. Sensors 166 may include one or more of the sensors 4, 5, and 6 described at least in connection with FIG. 1A and can be used for sensing both torque and angle in some embodiments.

The multi-turn angle sensor system 160 of FIG. 4 can also include a processing circuit 168 and a printed circuit board (PCB) 163 on which the MT sensor 100, the angle and/or torque sensors 166, and the processing circuit 168 are disposed. The processing circuit 168 can receive signal(s) $S_M$ from the MT sensor 100 and signal(s) $S_A$ from the angle and/or torque sensors 166 and then process these received signals to provide a turn count, rotational angle position (or angle), and/or torque measurement. The processing circuit 168 can include a half-turn decoder 169. The half-turn decoder 169 can receive signal(s) $S_M$ from the MT sensor 100 and output a half-turn count. The signal(s) $S_M$ from the MT sensor 100 and the signal(s) $S_A$ from the angle and/or torque sensors 166 can be analog signals. For instance, the signal(s) $S_M$ from the MT sensor 100 can be voltage signals derived from resistor networks, such as Wheatstone bridges including GMR resistors.

Figure 5A:
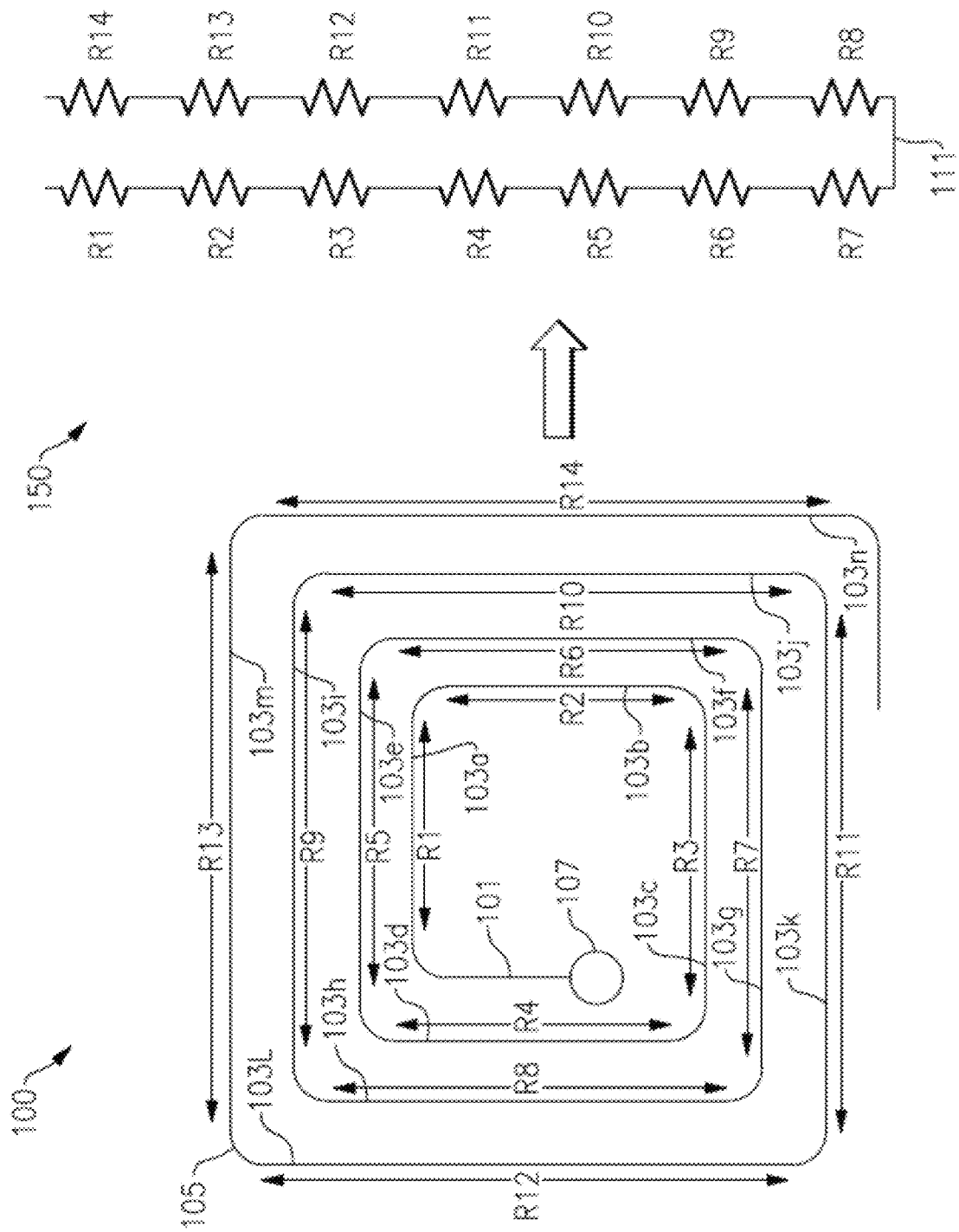
FIG. 5A shows an example magnetic strip layout representation of a multi-turn sensor with a corresponding circuit schematic representation according to an embodiment.

FIG. 5A shows an example magnetic strip layout representation of a multi-turn sensor 100 with a corresponding circuit schematic representation 150 according to an embodiment. In the embodiment of FIG. 5A, a magnetic strip 101 is patterned on a chip. The magnetic strip 101 has corners 105 and segments 103a to 103n forming magnetoresistive elements R1 to R14 arranged in series with each other, and a domain wall generator 107. The magnetoresistive elements can act as variable resistors that change resistances in response to a magnetic alignment state. The magnetic strip pattern of the multi-turn sensor 100 illustrated can be implement in a multi-turn counter that can count at least 3 turns. The multi-turn sensor 100 may operate (e.g., record turns) without power.

The magnetic strip 101 can be a giant magnetoresistance track that is physically laid out in the shape of a spiral. As illustrated in FIG. 5A, such a spiral shaped magnetic strip 101 can have rounded corners 105 and segments 103a to 103n. The magnetic strip 101 can have a magnetic anisotropy, such as a high anisotropy, based on the material and cross sectional dimensions of the magnetic strip 101. The magnetic strip 101 can store magnetic energy. A domain wall generator (DWG) 107 is coupled to one end of the magnetic strip 101. The DWG 107 can have a magnetic anisotropy, such as a low anisotropy. The domain wall generator can generate domain walls in response to rotations in a magnetic field. The domain walls can be injected to the magnetic strip 101.

The segments 103a to 103n of the magnetic strip 101 are shown as straight sides of the magnetic strip 101 in the example of FIG. 5A. The segments 103a to 103n can have a variable resistance based on the magnetic domain of the segment. As the magnetic domain of a segment changes, the resistance of that segment can change. Accordingly, the segments 103a to 103n can operate as magnetoresistive elements, also referred to as variable resistors R1 to R14, respectively, herein. The magnetoresistive elements R1 to R14 can also function as non-volatile, magnetic memory that can be magnetically written and electrically read. The magnetoresistive elements R1 to R14, as laid out in the spiral shaped magnetic strip 101, are coupled in series with each other. Corresponding circuit schematic representation 150 shows segments 103a to 103n depicted as corresponding magnetoresistive elements R1 to R14, respectively, connected in series.

Figure 2B:
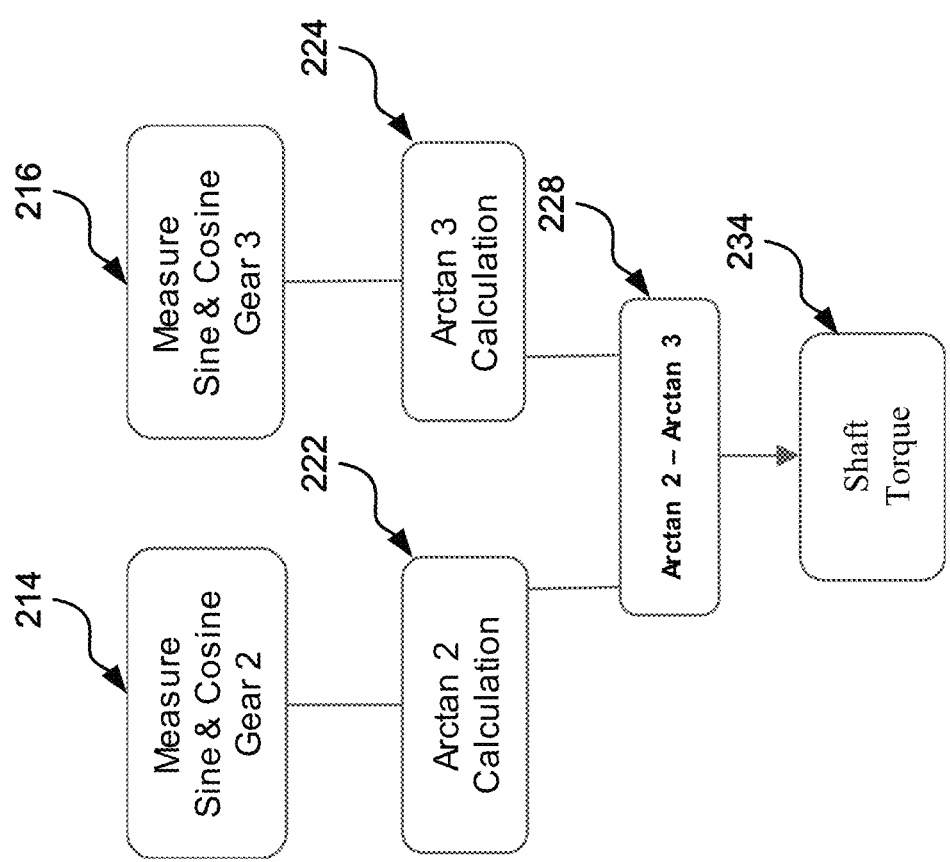
FIG. 2B is a flow diagram of a process for measuring steering torque according to an embodiment.
Figure 5B:
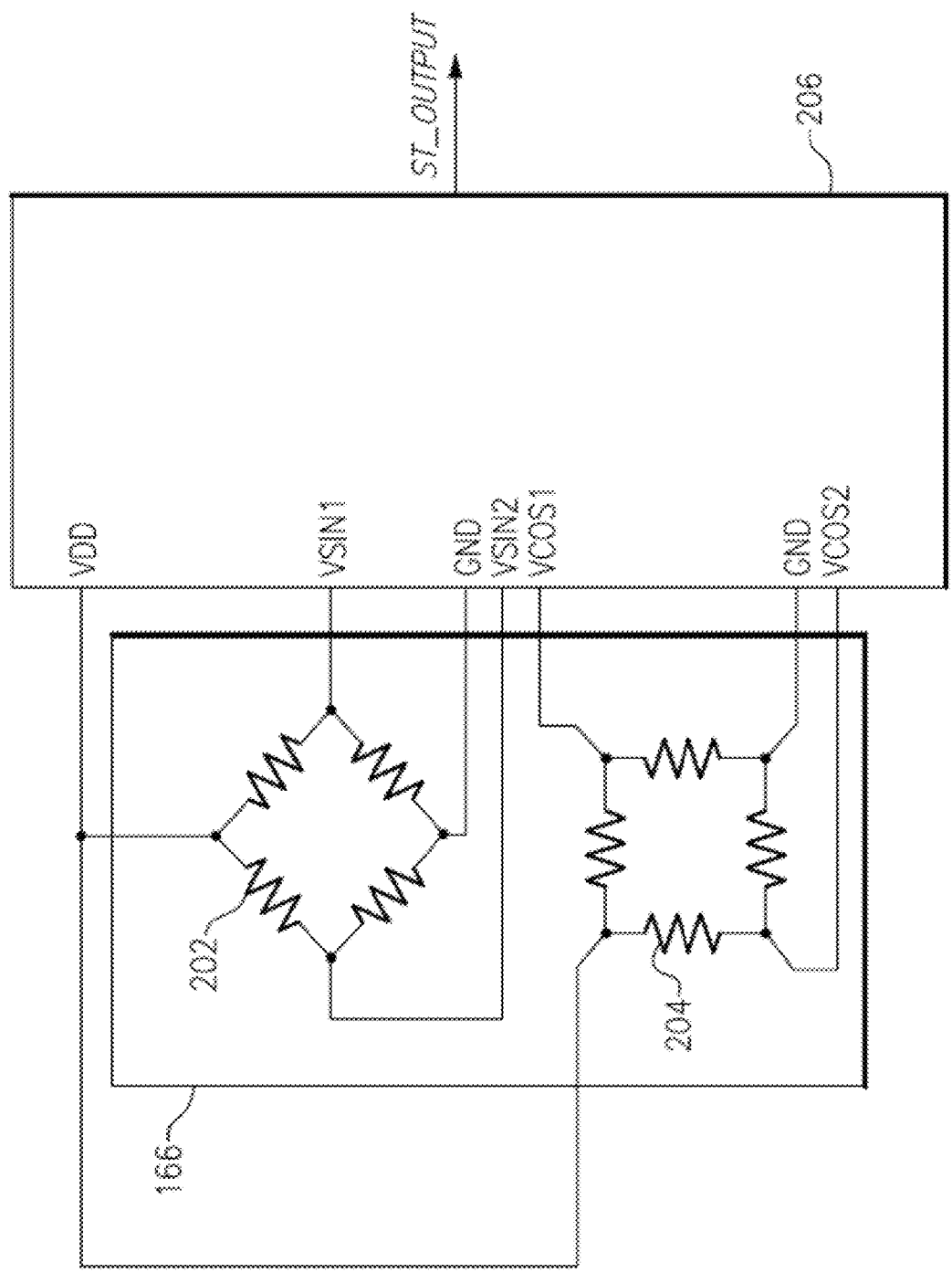
FIG. 5B is a schematic diagram showing an example of a magnetic angle sensor with an interface circuit according to an embodiment.

FIG. 5B is a schematic diagram showing an example of a magnetic angle and/or torque sensors 166 with an interface circuit 206 according to an embodiment. The interface circuit 206 can be part of the processing circuit 168. Alternatively, the interface circuit 206 can be a separate circuit between the processing circuit 168 and the output of the angle and/or torque sensors 166. As shown in FIG. 2B, the angle and/or torque sensors 166 includes a first Wheatstone bridge 202 and a second Wheatstone bridge 204.

The first and second Wheatstone bridges 202 and 204, respectively, can include magneto-resistive elements, such as AMR elements, to sense a rotating magnetic field and to provide rotational angle between 0 and 360 degrees, which also corresponds to an angle of between 0 and $2\pi$ radians. Additionally, each AMR element can be patterned onto an integrated circuit using an AMR process so that the first Wheatstone bridge 202 is rotated with respect to the second Wheatstone bridge 204. By having the first and second Wheatstone bridges 202 and 204 rotated with respect to each other, the trigonometric sine and cosine of a rotational magnetic field can be determined over a range of 0 to 360 degrees.

As shown in FIG. 5B, both the first and the second Wheatstone bridges 202 and 204, respectively, are electrically connected to a supply voltage VDD and to ground GND. As illustrated, the interface circuit 206 receives voltages VSIN1 and VSIN2 from the sense nodes of the first Wheatstone bridge 202 and receives voltages VCOS1 and VCOS2 from the sense nodes of the second Wheatstone bridge 204. The voltages VSIN1, VSIN2, VCOS1, and VCOS2 of FIG. 2B can represent components of the signals $S_A$ of FIG. 1. The interface circuit 206 can process the voltages VSIN1 and VSIN2 and the voltages VCOS1 and VCOS2 to determine sine and cosine signals, respectively, associated with a magnetic field. From the sine and cosine signals, the interface circuit 206 can determine an the angle of the magnetic field between 0 and 360 degrees. In the embodiment of FIG. 5B, the interface circuit 206 provides a single turn angle output data ST_Output.

As examples, sensors 4, 5, and 6 of various figures including FIG. 1A may be provided using a sensor such as angle and/or torque sensors 166 of FIG. 5B. As shown in FIG. 5B, each of these sensors may have a sine output (such as VSIN1 and/or VSIN2) and a cosine output (such as VCOS1 and/or VCOS2) which together may provide sufficient information on the direction of the magnetic field passing through that sensor to obtained the desired measurements.

Sensor 11, which is used in tracking full turns, may also be provided using a sensor such as angle and/or torque sensors 166 of FIG. 5B. In such embodiments, a controller in sensor module 13 or some other portion of system 50 may use one or more of the outputs of the angle and/or torque sensors 166 implementing sensor 11 to detect passage (and optionally direction) of magnetic target 12 and hence full (or half or quarter) turns of the shafts. In other embodiments, sensor 11 may be provided using a multi-turn sensor such as multi-turn (MT) sensor 100 of FIG. 5A. In such embodiments, sensor 11, implemented using a multi-turn sensor 100, may magnetically record quarter, half, or full turns of the shafts. In still other embodiments, sensor 11 may be omitted and a controller may monitor shaft rotation (via sensors 4 and 5 and targets 1 and 2) to track turn count. In particular, the controller may detect whenever the shaft has rotated through a known, calibrated, or predetermined 0 degree angle and in which direction and record an appropriate turn count. The turn count may thus be tracked via software implemented in a controller or other component of system 50. With a multi-turn sensor, a turn count corresponding to more than one full turn can be tracked.

Figure 6:
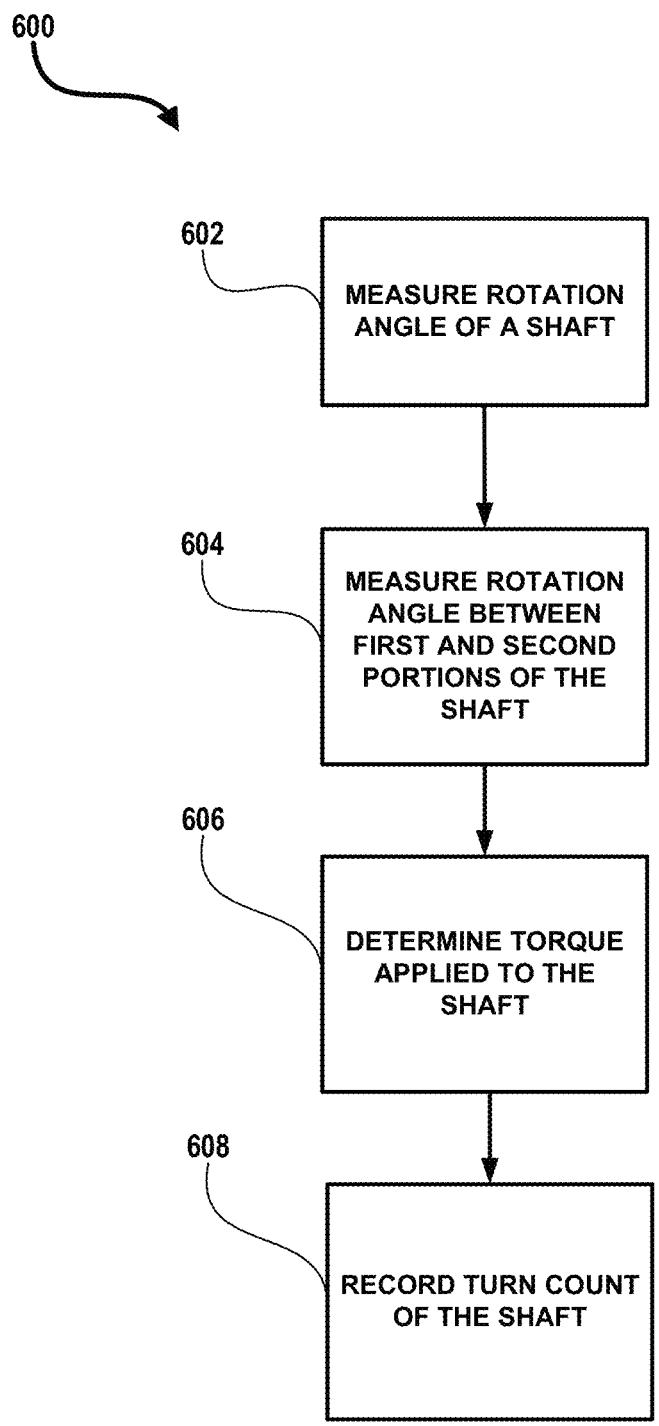
FIG. 6 is a process flow diagram of an example of a method of measuring torque, rotation angle, and turn count of a shaft using magnetic sensors according to an embodiment.

FIG. 6 is a process flow diagram of an example of a method 600 of measuring torque, rotation angle, and turn count of a shaft using magnetic sensors according to an embodiment. The operations of the method 600 can be performed in any order as appropriate. One or more of torque, rotation angle, and turn count of the shaft can be measure using one or more suitable magnetic sensors in accordance with any suitable principles and advantages disclosed herein. The method 600 describes how a system, such as system 50 of FIG. 1A, that includes magnetic field sensors can measure torque, rotation angle, and/or turn count of a shaft.

At block 602, the system may measure the rotation angle a shaft. As described at least in connection with FIG. 1A, the system 50 may measure the rotation angle using a pair of magnetic targets such as targets 1 and 2 and a corresponding pair of magnetic sensors 4 and 5. In at least some embodiments, the magnetic targets 1 and 2 may have structures configured such that the targets 1 and 2 induce magnetic fields that can be used to determine the rotation angle of the shaft. As an example, magnet target 1 may have n structures disposed around its perimeter, while magnetic target 2 may have n+1 or n−1 structures disposed around its perimeter. The system may be able to determine the rotation angle of the shaft by comparing signals from magnetic sensors 4 and 5 at least partly due to the different configurations of targets 1 and 2. Further details are discussed in connection with at least FIG. 2A.

At block 604, the system measures the relative rotation angle, including its magnitude and direction, between first and second portions of the shaft. As described at least in connection with FIG. 1A, the system 50 may measure the rotation angle of first shaft 8 relative to the second shaft 9, which can be coupled together by torsion element 10. The system may measure the relative rotation angles of shafts 8 and 9 using a pair of magnetic targets such as targets 2 and 3 and a corresponding pair of magnetic sensors such as sensors 5 and 6. In at least some embodiments, the magnetic targets 2 and 3 may have structures, such as gear teeth, configured such that the targets 2 and 3 induce magnetic fields that can be used to determine the rotation of shaft 8 relative to shaft 9. Further details of an example of determining shaft rotation angle are discussed in connection with at least FIG. 2A.

At block 606, the system determines the magnitude and direction of torque applied to the shaft. In at least some embodiments, the shafts 8 and 9 may be coupled together by a torsion element 10 have a torsion coefficient. When torque is applied to one of the shafts 8 or 9, that torque may be transferred through the torsion element 10 and the torsion element may twist in proportion to the magnitude of the torque. The direction of twist may be determined by the direction of the applied torque. The system may determine the magnitude of torque applied to the shaft by multiplying the torsion coefficient of the torsion element 10 by the magnitude of the relative rotation between the first and second portions of the shaft, which was determined at block 604. Additionally, the system may determine the direction of the applied torque by reference to the direction of the relative rotation determined at block 604.

At block 608, the system records a turn count of the shaft. As described at least in connection with FIG. 1A, the system 50 may record a turn count of shafts 8 and 9 using a magnetic target such as target 12 and a magnetic sensor such as sensor 11. Sensor 11 may be a multiturn counter capable of recording the turn count even without power applied to the sensor 11. The turn count can correspond to more than one full turn. The turn count can be represented by a number of full turns in some instances. Alternatively, the turn count can correspond to any suitable number of a fractional turns, such as quarter turns or half turns.

Figure 7A:
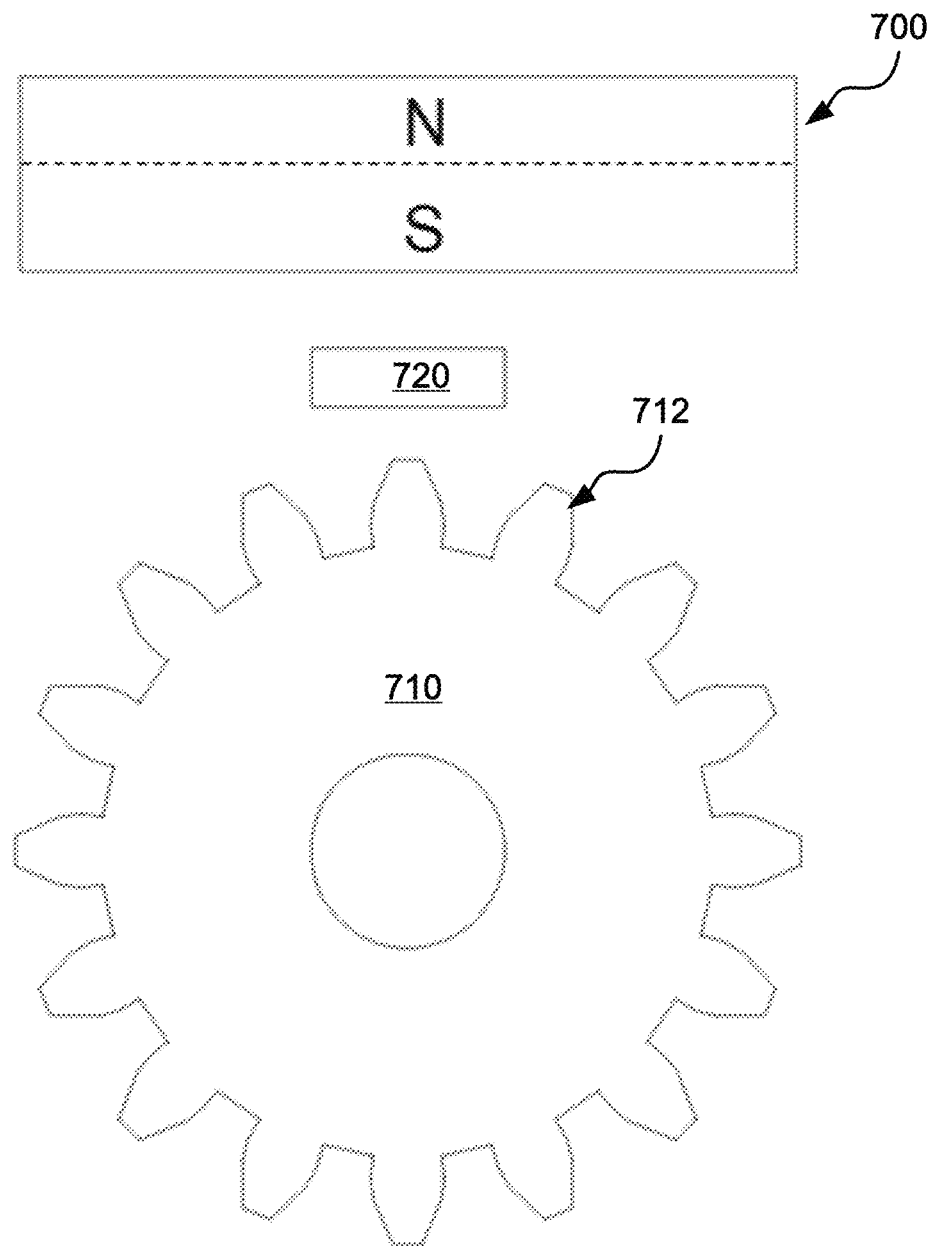
FIG. 7A is a schematic diagram of a magnetic sensor system that includes a bias magnet, a magnetic sensor, and a magnetic target according to an embodiment.
Figure 7B:
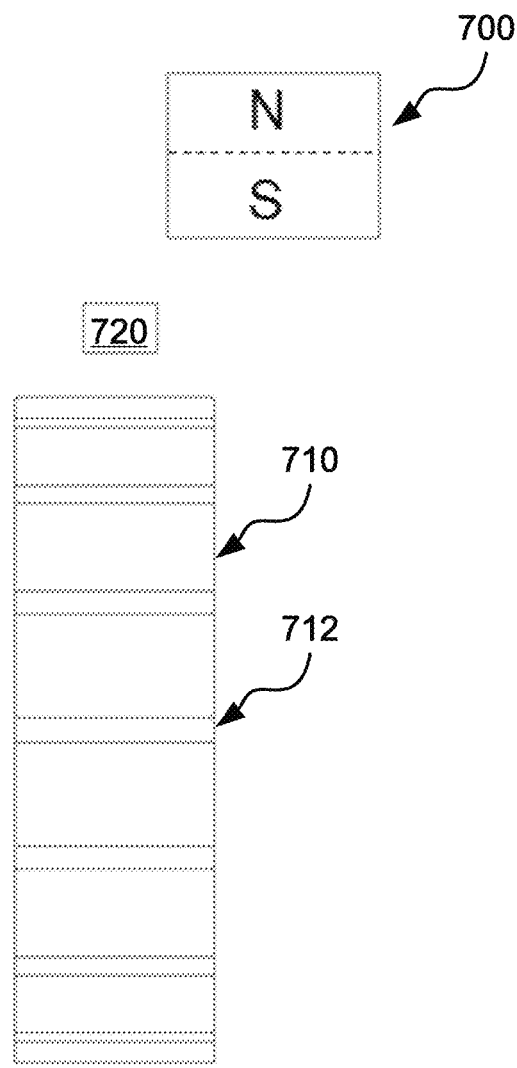
FIG. 7B is a schematic diagram showing a side view of the magnetic sensor system of FIG. 7A according to an embodiment.
Figure 7C:
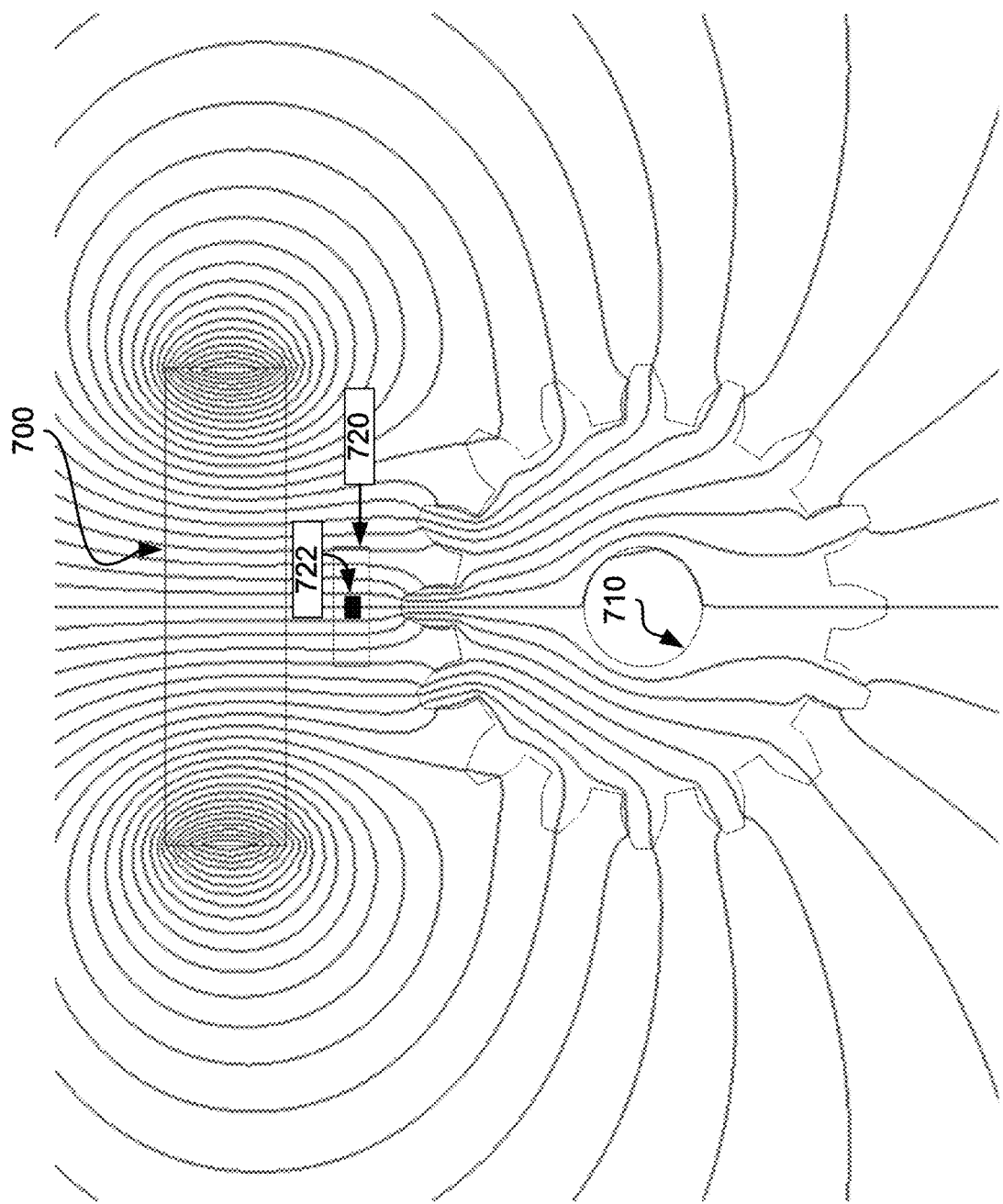
FIG. 7C is a schematic diagram of the magnetic sensor system of FIG. 7A showing magnetic flux lines from the bias magnet interacting with the magnetic target and the magnetic sensor according to an embodiment.

Schematic diagrams of a magnetic sensor system that includes a bias magnet 700, a magnetic target 710, and a magnetic sensor 720 are shown in FIGS. 7A, 7B, 7C, and 7B. As examples, each of sensors 4, 5, and 7 may be provided using a sensor such as magnetic sensor 720, bias magnet 7 may be provided as bias magnet 700 (which may be common to multiple sensors, if desired), and each of magnetic targets 1, 2, and 3 may be provided using a magnetic target such as magnetic target 710.

FIG. 7A shows a top-down view and FIG. 7B shows a side-view of s magnetic sensor system. In the perspective of FIG. 7A, the magnetic target 710 rotates about an axis that is perpendicular to the page. As shown in FIGS. 7A and 7B, the magnetic sensor 720 may be disposed between the bias magnet 700 and the magnetic target 710. Additionally, the magnetic target 710 may include a number of structures 712, which may be tooth-like structures. In at least some embodiments, the bias magnet 700 may be oriented such that its north pole is oriented away from and its south pole oriented towards (or vice-versa) the magnetic sensor and target. As shown in FIG. 7B, the bias magnet 700 is offset from the magnetic sensor 720. This arrangement can generate a bias magnetic field.

The structures 712 of the magnetic target 710 may induce, as a function of the rotational position of the magnetic target 710 relative to the sensor 720, changes in the magnetic field passing through magnetic sensor 720. Magnetic sensor 720 may detect these changes in the magnetic field and determine from the changes a rotation angle of a shaft coupled to the magnetic target (e.g., by comparing measurements made with two different magnetic targets, as described in connection with at least targets 1 and 2 and sensors 4 and 5 of FIG. 1A) and/or a torque applied to the shaft (e.g., by comparing different measurements made with two different magnetic targets, as described in connection with at least targets 2 and 3 and sensors 5 and 6 of FIG. 1A).

Figure 7D:
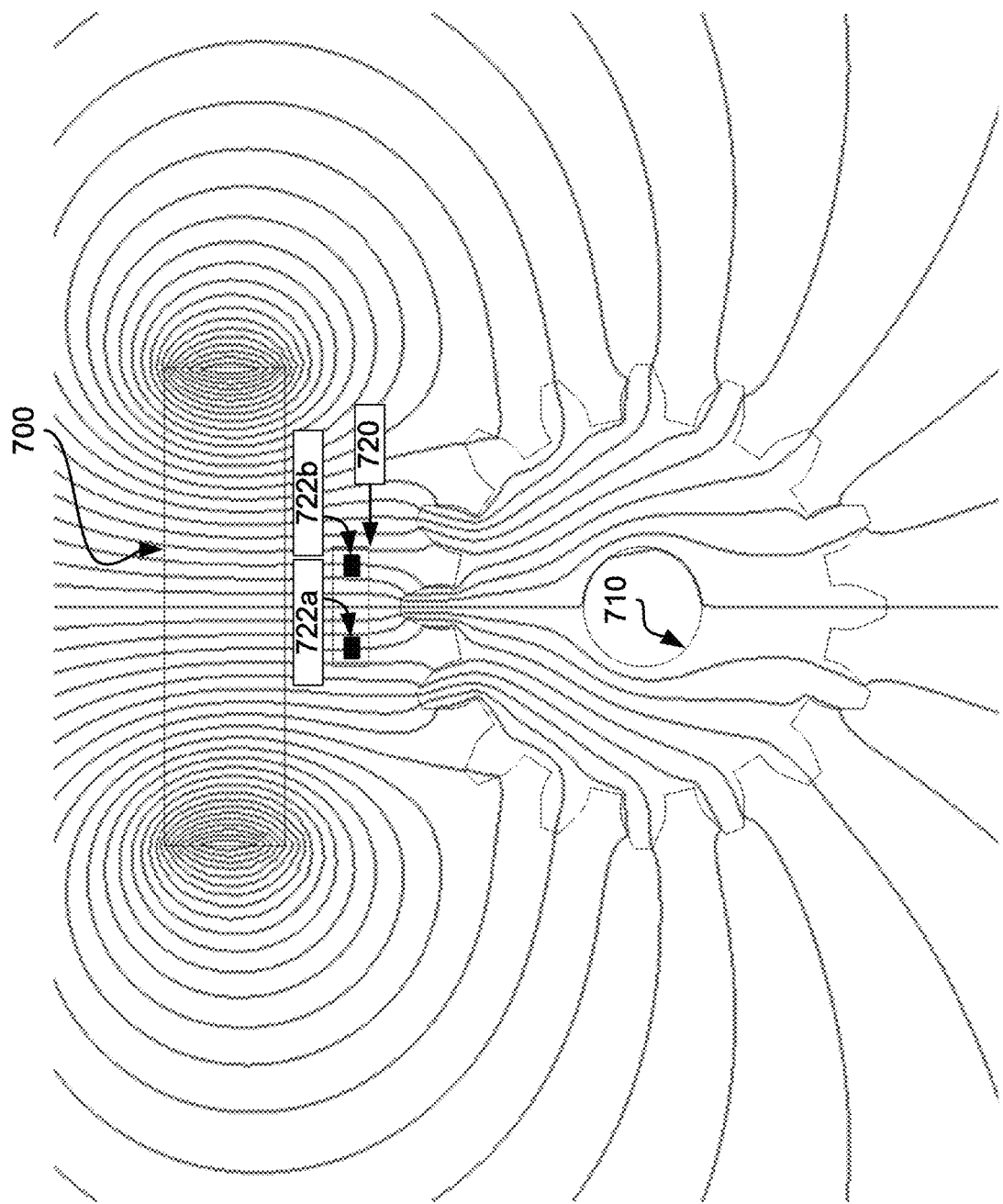
FIG. 7D is a schematic diagram of the magnetic sensor system of FIG. 7A showing magnetic flux lines and showing an embodiment in which the sensor includes two discrete magnetic sensors according to an embodiment.

As shown in FIGS. 7C and 7D, the bias magnet 700 may generate a magnetic field and the magnetic target 710 may induce changes in the magnetic field that vary with the rotational position of the magnetic target 710, where those changes in the magnetic field are detectable by one or more magnetic sensors such as sensor 720. FIGS. 7C and 7D illustrate the magnetic field flux lines of this magnetic field.

As illustrated in FIG. 7C, magnetic sensor 720 may, in some embodiments, include a single sensing element 722 (e.g., which may be the angle and/or torque sensors 166 of FIG. 5B) capable of sensing changes in the magnetic field (e.g., changes in direction of the magnetic flux lines passing through the sensor).

In some other embodiments, magnetic sensor 720 may, as illustrated in FIG. 7D, include two (or more) sensing elements 722a and 722b. In such embodiments, the magnetic sensor 720 may use the multiple sensing elements 722a and 722b in a differential manner. In other words, the magnetic sensor 720 may measure changes in the magnetic field pass through the magnetic sensor by determining differences in measurements from sensing element 722a and measurements from sensing element 722b.

A magnetic sensor 720 can include a plurality of mangetoresistive strips on a sensor chip. The magnetic sensor 720 can generate a differential magnetic field measurement using the magnetoresistive strips. There can be two sensing areas on the sensor chip. One area can be for a sine signal and the other area can be for a cosine signal. Each area can include a plurality of magnetoresistive strips. A resistor of a bridge can be made up of one or more of the magnetoresistive strips. In some instances, a resistor can include a magnetoresistive strip in each of the two areas of the sensor chip. The two areas of the sensor chip can overlap with each other in certain applications.

The technology disclosed herein can be implemented in a variety of electronic systems. Aspects of the disclosure are applicable to any systems and/or devices that could benefit from the magnetic sensing technology disclosed herein.

Aspects of this disclosure can be implemented in various electronic devices. For instance, aspects of this disclosure can be implemented in any electronic device or electronic component that could benefit from the technology disclosed herein. Examples of the electronic devices can include, but are not limited to, consumer electronic products, parts of the consumer electronic products, electronic test equipment, vehicular electronics systems, etc. Examples of the electronic devices can include, but are not limited to, computing devices, communications devices, electronic household appliances, automotive electronics systems, other vehicular electronics systems, industrial control electronics systems, etc. Further, the electronic devices can include unfinished products.

Throughout the description and the claims, the words "comprise," "comprising," "include," "including," and the like are to generally be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural may also include the plural or singular, respectively. The word "or" in reference to a list of two or more items, is generally intended to encompass all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments of the inventions have been described, these embodiments have been presented by way of example only, and are not intended to limit the scope of the disclosure. Indeed, the novel methods, apparatus, and systems described herein may be embodied in a variety of other forms; furthermore, various omissions, substitutions and changes in the form of the methods, apparatus, and systems described herein may be made without departing from the spirit of the disclosure. For example, circuit blocks and/or circuit elements described herein may be deleted, moved, added, subdivided, combined, and/or modified. Each of these circuit blocks and/or circuit elements may be implemented in a variety of different ways. The accompanying claims and their equivalents are intended to cover any such forms or modifications as would fall within the scope and spirit of the disclosure.

What is claimed is:

1. A magnetic torque sensor system comprising:
   at least one bias magnet configured to produce at least one magnetic field;
   magnetic sensors comprising a first magnetic sensor sensitive to changes in the at least one magnetic field induced by a first magnetic target, and a second magnetic sensor sensitive to changes in the at least one magnetic field induced by a second magnetic target; and
   a processing circuit in communication with the first magnetic sensor and the second magnetic sensor, the processing circuit configured to:
   calculate a first arctangent value based on an output from the first magnetic sensor;
   calculate a second arctangent value based on an output from the second magnetic sensor;
   determine a difference between the first arctangent value and the second arctangent value; and
   generate torque information associated with an amount of torque applied to a shaft based on the difference between the first arctangent value and the second arctangent value.

2. The magnetic torque sensor system of claim 1, further comprising the first magnetic target coupled to a first shaft portion of a shaft and the second magnetic target coupled to a second shaft portion of the shaft.

3. The magnetic torque sensor system of claim 2, wherein the first magnetic target comprises a first toothed gear, and wherein the second magnetic target comprises a second toothed gear that has the same number of teeth as the first toothed gear.

4. The magnetic torque sensor system of claim 2, wherein the first magnetic target and the second magnetic target have the same number of magnetic structures as each other.

5. The magnetic torque sensor system of claim 2, wherein the first shaft portion is coupled to the second shaft portion via a torsion element.

6. The magnetic torque sensor system of claim 5, further comprising a torsion element arranged to couple the first shaft portion to the second shaft portion, the torsion element configured to twist by an amount that depends upon the amount of torque applied to the shaft.

7. The magnetic torque sensor system of claim 1, further comprising a third magnetic sensor sensitive to changes in the at least one magnetic field induced by a third magnetic target, wherein the processing circuit is further configured to:
 calculate a third arctangent value based on an output from the third magnetic sensor;
 detect a difference between the first arctangent value and the third arctangent value; and
 generate shaft rotation angle information associated with a rotation angle of the shaft based on the detected difference between the first arctangent value and the third arctangent value.

8. The magnetic torque sensor system of claim 7, further comprising the first magnetic target and the third magnetic target, wherein the first magnetic target comprises a first toothed gear, and wherein the third magnetic target comprises a third toothed gear having a different number of teeth than the first toothed gear.

9. The magnetic torque sensor system of claim 7, further comprising the first magnetic target and the third magnetic target, wherein the first magnetic target and the third magnetic target have different numbers of magnetic structures than each other.

10. The magnetic torque sensor system of claim 7, further comprising a fourth magnetic sensor sensitive to changes in the at least one magnetic field induced by a fourth magnetic target, wherein the processing circuit is further configured to generate a turn count of the shaft based on one or more measurements from the fourth magnetic sensor.

11. The magnetic torque sensor system of claim 1, wherein the first magnetic sensor is a magnetoresistive sensor.

12. The magnetic torque sensor system of claim 1, further comprising a multi-turn magnetic sensor including a magnetic strip, wherein the processing circuit is configured to generate a turn count corresponding to more than one turn of the shaft based on an output of the multi-turn magnetic sensor.

13. A magnetic sensor system comprising:
 at least one bias magnet configured to produce at least one magnetic field;
 a first magnetic sensor sensitive to changes in the at least one magnetic field induced by a first magnetic target;
 a second magnetic sensor sensitive to a second change in the magnetic field induced by a second magnetic target;
 a multi-turn magnetic sensor including a magnetic strip; and
 a processing circuit in communication with the first magnetic sensor and the second magnetic sensor, the processing circuit configured to:
  detect a difference between first and second arctangent values calculated based on measurements obtained from the first magnetic sensor and the second magnetic sensor;
  generate shaft rotation angle information associated with a rotation angle of a shaft based on the difference between the first and second arctangent values; and
  generate a turn count corresponding to more than one turn of the shaft based on an output of the multi-turn magnetic sensor.

14. The magnetic sensor system of claim 13, further comprising the first magnetic target coupled to a first shaft portion of a shaft and the second magnetic target coupled to a second shaft portion of the shaft.

15. The magnetic sensor system of claim 14, wherein the first magnetic target comprises a first toothed gear, and wherein the second magnetic target comprises a second toothed gear having a different number of teeth than the first toothed gear.

16. The magnetic sensor system of claim 14, wherein the first magnetic target and the second magnetic target have different numbers of magnetic structures than each other.

17. The magnetic sensor system of claim 13, wherein the processing circuit is further configured to:
 calculate the first arctangent value based on the first magnetic field measurement; and
 calculate the second arctangent value based on the second magnetic field measurement.

18. A method of measuring torque applied to a shaft, the shaft including first and second shaft portions coupled together, the method comprising:
 obtaining, from a first magnetic sensor, a first magnetic field measurement associated with rotation of the first shaft portion, wherein the first magnetic field measurement is representative of changes induced by a first magnetic target in at least one magnetic field produced by at least one bias magnet;
 calculating a first arctangent value based on the first magnetic field measurement;
 obtaining, from a second magnetic sensor, a second magnetic field measurement associated with rotation of the second shaft portion, wherein the second magnetic field measurement is representative of changes induced by a second magnetic target in the at least one magnetic field produced by the at least one bias magnet;
 calculating a second arctangent value based on the second magnetic field measurement;
 determine a difference between the first arctangent value and the second arctangent value; and
 generating, with a processing circuit, a measure of torque applied to the shaft based on the difference between the first arctangent value and the second arctangent value.

19. The method of claim 18, further comprising:
 obtaining, from a third magnetic sensor, a third magnetic field measurement associated with rotation of the first shaft portion, wherein the third magnetic field measurement is representative of changes induced by a third magnetic target in the at least one magnetic field produced by the at least one bias magnet;
 calculate a third arctangent value based on the third magnetic field measurement; and
 generating, with the processing circuit, shaft rotation angle information based on a difference between the first arctangent value and the third arctangent value.

20. The method of claim 18, further comprising providing the measure of torque to an electric power assisted steering controller arranged to control a steering system.

\* \* \* \* \*